US009317767B2

(12) United States Patent
Zadeh et al.

(10) Patent No.: US 9,317,767 B2
(45) Date of Patent: *Apr. 19, 2016

(54) SYSTEM AND METHOD FOR SELECTING SEGMENTATION PARAMETERS FOR OPTICAL CHARACTER RECOGNITION

(71) Applicant: Cognex Corporation, Natick, MA (US)

(72) Inventors: Ali Zadeh, Natick, MA (US); John Petry, Newton, MA (US)

(73) Assignee: Cognex Corporation, Natick, MA (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/653,948

(22) Filed: Oct. 17, 2012

(65) Prior Publication Data

US 2014/0105496 A1  Apr. 17, 2014

(51) Int. Cl.
*G06K 9/34* (2006.01)
*G06K 9/00* (2006.01)

(52) U.S. Cl.
CPC ............ *G06K 9/344* (2013.01); *G06K 9/00409* (2013.01); *G06K 9/00436* (2013.01)

(58) Field of Classification Search
CPC ........... G06K 9/34–9/348; G06K 9/32; G06K 9/00872; G06K 9/72; G06T 7/0079–7/0097
USPC ....................................................... 382/177
See application file for complete search history.

(56) References Cited

U.S. PATENT DOCUMENTS

| 5,608,874 | A  | * | 3/1997  | Ogawa et al. ............... 709/246 |
| 6,600,834 | B1 | * | 7/2003  | Su et al. .................... 382/187 |
| 8,315,462 | B2 | * | 11/2012 | Nakamura .................. 382/181 |
| 8,600,143 | B1 | * | 12/2013 | Kulkarni et al. ............. 382/133 |

FOREIGN PATENT DOCUMENTS

| JP | H03229387    | 11/1991 |
| JP | H05303663    | 11/1993 |
| JP | H05035916    | 12/1993 |
| JP | H11-338975 A | 10/1999 |
| JP | 2000293626   | 10/2000 |
| WO | 0210884 A2   | 2/2002  |

OTHER PUBLICATIONS (Vamvakas, G., "Automatic Unsupervised Parameter Selection for Character Segmentation"; Jun. 2010; DAS's 10, Boston, MA, ACM978-1-60558-773).*

(Continued)

*Primary Examiner* — Siamak Harandi
(74) *Attorney, Agent, or Firm* — Holland & Knight LLP

(57) ABSTRACT

A computer-implemented method for selecting at least one segmentation parameter for optical character recognition is provided. The method can include receiving an image having a character string that includes one or more characters. The method can also include receiving a character string identifying each of the one or more characters. The method can also include automatically generating at least one segmentation parameter. The method can also include performing segmentation on the image having the character string using the at least one segmentation parameter. The method can also include determining if a resultant segmentation satisfies one or more criteria and if the resultant segmentation satisfies the one or more criteria, selecting the at least one segmentation parameter.

18 Claims, 20 Drawing Sheets

(56) References Cited

OTHER PUBLICATIONS (Paulto Rodrigo Cavalin, "An Implicit Segmentation-based Method for Recognition of Handwritten Strings of Characters"; SAC'06 Apr. 2006, Dijon, France).*

Zhou, Xiang-Dong, "A Robust Approach to Text Line Grouping in Online Handwritten Japanese Documents", 2008; Elservier.
Office Action issued on Oct. 7, 2014 in JP2013215516.
Office Action issued in corresponding German Patent Application No. 10 2013 220 470.1 issued on Mar. 30, 2015.

* cited by examiner

SYSTEM AND METHOD FOR SELECTING SEGMENTATION PARAMETERS FOR OPTICAL CHARACTER RECOGNITION

TECHNICAL FIELD

This technology relates to machine vision systems and methods, and more particularly to systems and methods for optical character recognition.

BACKGROUND

OCR technology is often used in many machine vision systems in order to detect text associated with various manufacturing processes. However, setting up OCR parameters for a given application is extremely hard, especially for a new user. For example, when a user selects a region around an OCR character string and the segmenter does not find the characters correctly, the user often encounters difficulty in attempting to manually troubleshoot the problem. Unlike many applications, which can be solved in advance by a system integrator, OCR can require technicians or engineers on the production floor to train or modify the runtime parameters. This can happen when new parts are introduced, or new printing or labels are used. Existing systems can be fairly easy to set up if the default segmentation parameters work, however, when they don't work, the user is confronted with a list of 20-30 parameters that might require adjustment. This is beyond the skill level of most users.

SUMMARY OF DISCLOSURE

In one implementation, a computer-implemented method for selecting at least one segmentation parameter for optical character recognition is provided. The method can include receiving, using one or more computing devices, an image having a character string that includes one or more characters. The method can also include receiving, using the one or more computing devices, a character string identifying each of the one or more characters. The method can also include automatically generating, using the one or more computing devices, at least one segmentation parameter. The method can also include performing segmentation, using the one or more computing devices, on the image having the character string using the at least one segmentation parameter. The method can also include determining, using the one or more computing devices, if a resultant segmentation satisfies one or more criteria and if the resultant segmentation satisfies the one or more criteria, the method can include selecting the at least one segmentation parameter.

One or more of the following features can be included. In some embodiments, the method can include providing, using the one or more computing devices, a user-selectable option associated with the segmentation, the user-selectable option configured to allow a user to indicate either a correct segmentation or an incorrect segmentation. The method can also include providing, using the one or more computing devices, a user-selectable option configured to allow a user to manually generate a manually generated segmentation. The method can also include determining, using one or more computing devices, if a resultant segmentation satisfies one or more criteria based on the criteria being set to a threshold value or an optimization value. The method can also include generating, using the one or more computing devices, a database of characters using, at least in part, one or more of the first character string and the additional character string. The method can also include receiving, using the one or more computing devices, an indication of a correct segmentation for the character string having a correct set of segmentation parameters. The method can also include applying, using the one or more computing devices, the correct set of segmentation parameters to a second character string. In some embodiments, identifying can include identifying compliance with an ASCII uniformity criterion. In some embodiments, the at least one segmentation parameter can include one or more of polarity, line refinement, angle search range, skew search range, normalization mode, stroke width, binarization threshold, border fragments, pixel count, fragment contrast threshold, character height, character width, intercharacter gap, intracharacter gap, fragment distance to main line, fragment merge mode, minimum character aspect, character width type, analysis mode, pitch metric, pitch type, minimum pitch, space insertion, width of space character.

In another implementation, a computer program product residing on a computer readable storage medium is provided. The computer program product can have a plurality of instructions stored thereon, which when executed by a processor, cause the processor to perform operations. Operations can include receiving, using one or more computing devices, an image having a character string that includes one or more characters. Operations can also include receiving, using the one or more computing devices, a character string identifying each of the one or more characters. Operations can also include automatically generating, using the one or more computing devices, at least one segmentation parameter. Operations can also include performing segmentation, using the one or more computing devices, on the image having the character string using the at least one segmentation parameter. Operations can also include determining, using the one or more computing devices, if a resultant segmentation satisfies one or more criteria and if the resultant segmentation satisfies the one or more criteria, operations can include selecting the at least one segmentation parameter.

One or more of the following features can be included. In some embodiments, operations can include providing, using the one or more computing devices, a user-selectable option associated with the segmentation, the user-selectable option configured to allow a user to indicate either a correct segmentation or an incorrect segmentation. Operations can also include providing, using the one or more computing devices, a user-selectable option configured to allow a user to manually generate a manually generated segmentation. Operations can also include determining, using one or more computing devices, if a resultant segmentation satisfies one or more criteria based on the criteria being set to a threshold value or an optimization value. Operations can also include generating, using the one or more computing devices, a database of characters using, at least in part, one or more of the first character string and the additional character string. The method can also include receiving, using the one or more computing devices, an indication of a correct segmentation for the character string having a correct set of segmentation parameters. The method can also include applying, using the one or more computing devices, the correct set of segmentation parameters to a second character string. In some embodiments, identifying can include identifying compliance with an ASCII uniformity criterion. In some embodiments, the at least one segmentation parameter can include one or more of polarity, line refinement, angle search range, skew search range, normalization mode, stroke width, binarization threshold, border fragments, pixel number, contrast threshold, character height, character width, intercharacter gap, intracharacter gap, character fragment distance, character fragment merge mode, wide character split, minimum character aspect, character width type, analysis mode, pitch metric, pitch type, minimum pitch, space insertion, space scoring, minimum width of space character, and maximum width of space character.

In another implementation, a computing system having one or more processors is provided. The one or more processors can be configured to receive an image having a character string that includes one or more characters. The one or more processors can be configured to receive a character string identifying each of the one or more characters. The one or more processors can be configured to automatically generate at least one segmentation parameter. The one or more processors can be configured to perform segmentation on the image having the character string using the at least one segmentation parameter. The one or more processors can be configured to determine if a resultant segmentation satisfies one or more criteria and if the resultant segmentation satisfies the one or more criteria, the one or more processors can be configured to select the at least one segmentation parameter.

One or more of the following features can be included. In some embodiments, the one or more processors can be further configured to provide a user-selectable option associated with the segmentation, the user-selectable option configured to allow a user to indicate either a correct segmentation or an incorrect segmentation. The one or more processors can be further configured to provide a user-selectable option configured to allow a user to manually generate a manually generated segmentation. The one or more processors can be further configured to receive at least one additional image, each having an additional character string. The one or more processors can be further configured to generate a database of characters using, at least in part, one or more of the first character string and the additional character string. The one or more processors can be further configured to receive an indication of a correct segmentation for the character string having a correct set of segmentation parameters. The one or more processors can be further configured to apply the correct set of segmentation parameters to a second character string. In some embodiments, identifying can include identifying compliance with an ASCII uniformity criterion. In some embodiments, the at least one segmentation parameter can include one or more of polarity, line refinement, angle search range, skew search range, normalization mode, stroke width, binarization threshold, border fragments, pixel number, contrast threshold, character height, character width, intercharacter gap, intracharacter gap, character fragment distance, character fragment merge mode, wide character split, minimum character aspect, character width type, analysis mode, pitch metric, pitch type, minimum pitch, space insertion, space scoring, minimum width of space character, and maximum width of space character.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings can indicate like elements.

DETAILED DESCRIPTION OF THE EMBODIMENTS

System Overview:

Embodiments of the present disclosure can be used to assist a user in setting up optical character recognition parameters for a given application (e.g. a machine vision application). Generally, setting up OCR parameters for an application is extremely hard, especially for a new user. For example, when a user draws a region around the OCR character string and the segmentation process does not find the characters correctly, the user may not know the best way to proceed. Accordingly, embodiments disclosed herein can be used to assist the user in setting up OCR parameters as automatically as possible. Embodiments disclosed herein include an interactive/incremental approach to selecting segmentation parameters for OCR. Embodiments disclosed herein also include the ability to check the uniformity of segmentation results and the ability to automatically reject a particular configuration if it violates that uniformity. Embodiments disclosed herein also allow for the automatic selection of segmentation parameters based on specific statistical properties of good characters.

Figure 1:
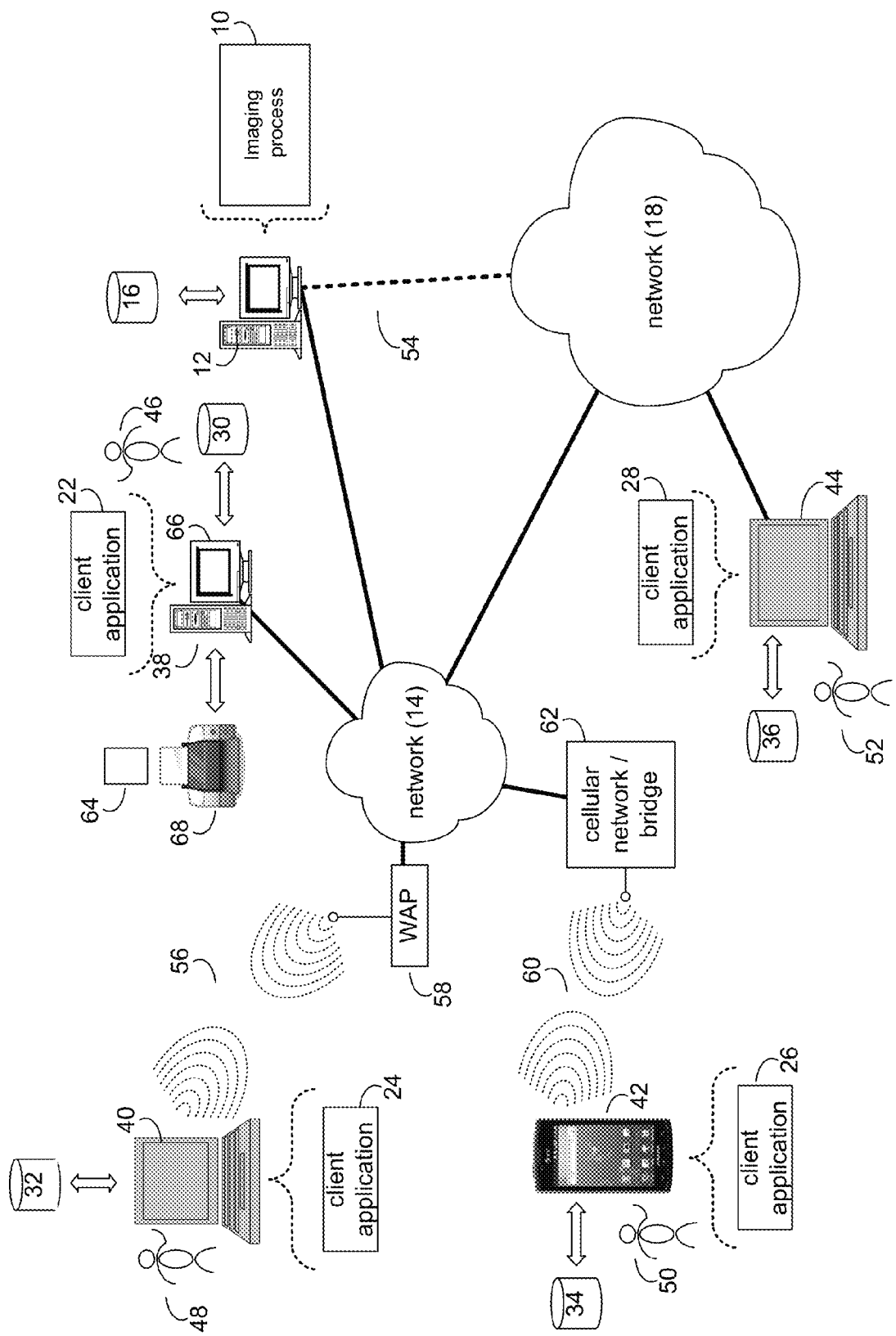
FIG. 1 is a diagrammatic view of an imaging process coupled to a distributed computing network.

Referring to FIG. 1, there is shown imaging process 10 that can reside on and can be executed by computer 12, which can be connected to network 14 (e.g., the Internet or a local area network). Examples of computer 12 can include but are not limited to a single server computer, a series of server computers, a single personal computer, a series of personal computers, a mini computer, a mainframe computer, or a computing cloud. The various components of computer 12 can execute one or more operating systems, examples of which can include but are not limited to: Microsoft Windows Server™; Novell Netware™; Redhat Linux™, Unix, or a custom operating system, for example.

The instruction sets and subroutines of imaging process 10, which can be stored on storage device 16 coupled to computer 12, can be executed by one or more processors (not shown) and one or more memory architectures (not shown) included within computer 12. Storage device 16 can include but is not limited to: a hard disk drive; a flash drive, a tape drive; an optical drive; a RAID array; a random access memory (RAM); and a read-only memory (ROM).

Network 14 can be connected to one or more secondary networks (e.g., network 18), examples of which can include but are not limited to: a local area network; a wide area network; or an intranet, for example.

Imaging process 10 can be accessed via client applications 22, 24, 26, 28. Examples of client applications 22, 24, 26, 28 can include but are not limited to a standard web browser, a customized web browser, or a custom application. The instruction sets and subroutines of client applications 22, 24, 26, 28, which can be stored on storage devices 30, 32, 34, 36 (respectively) coupled to client electronic devices 38, 40, 42, 44 (respectively), can be executed by one or more processors (not shown) and one or more memory architectures (not shown) incorporated into client electronic devices 38, 40, 42, 44 (respectively).

Storage devices 30, 32, 34, 36 can include but are not limited to: hard disk drives; flash drives, tape drives; optical drives; RAID arrays; random access memories (RAM); and read-only memories (ROM). Examples of client electronic devices 38, 40, 42, 44 can include, but are not limited to, personal computer 38, laptop computer 40, smart phone 42, notebook computer 44, a server (not shown), a data-enabled, cellular telephone (not shown), and a dedicated network device (not shown).

One or more of client applications 22, 24, 26, 28 can be configured to effectuate some or all of the functionality of imaging process 10. Accordingly, imaging process 10 can be a purely server-side application, a purely client-side application, or a hybrid server-side/client-side application that is cooperatively executed by one or more of client applications 22, 24, 26, 28 and imaging process 10.

Users 46, 48, 50, 52 can access computer 12 and imaging process 10 directly through network 14 or through secondary network 18. Further, computer 12 can be connected to network 14 through secondary network 18, as illustrated with phantom link line 54.

The various client electronic devices can be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 can be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications can use Ethernet protocol and carrier sense multiple access with collision avoidance (i.e., CSMA/CA) for path sharing. The various 802.11x specifications can use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 can each execute an operating system, examples of which can include but are not limited to Apple iOS™, Microsoft Windows™, Android™, Redhat Linux™, or a custom operating system.

Figure 2:
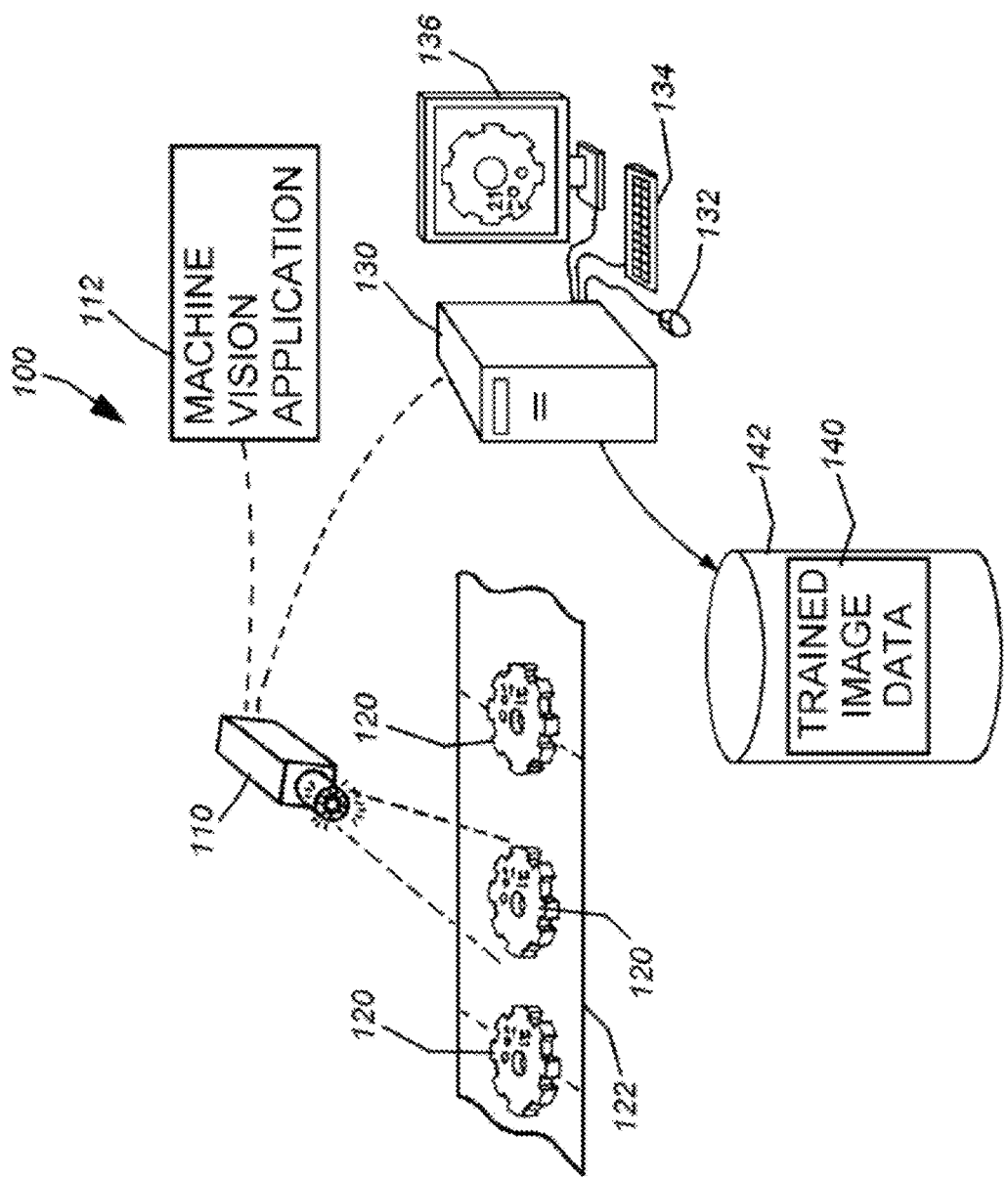
FIG. 2 is a system diagram corresponding to an embodiment of the imaging process of FIG. 1.

Referring now to FIG. 2, an exemplary embodiment depicting a machine vision system 100 configured for use with imaging process 10 is provided. It should be noted that a variety of system implementations can be employed in alternate embodiments without departing from the scope of the present disclosure. As will be described in further detail below, embodiments of imaging process 10 described herein can be generally employed to automatically tune segmentation parameters for one or more characters associated with a given character string. The imaging process described herein can be used at any suitable time during the inspection process. For example, in some embodiments, aspects of the imaging process can occur subsequent to the global positioning/registration of a live or runtime object image relative to a model or training image of the object, and prior to, during, or after inspection of the runtime object or feature.

In some embodiments, machine vision system 100 can include an imaging device 110, which can be a camera that includes an onboard processor (not shown) and a memory (not shown) capable of running a machine vision application 112. Appropriate interfaces, alarms, and signals can be installed in, and/or connected to, camera imaging device 110 so that it is able to respond to a sensed fault detected during the inspection of an underlying object 120. In this embodiment, a conveyor 122 containing a plurality of objects (120) is shown. These objects can pass, in turn, within the predetermined field of view (FOV) of the imaging device 110 during an inspection process. As such, the imaging device 110 can acquire at least one image of each observed object 120.

In some embodiments, conventional microcomputer 130 can be any suitable computing device such as computer 12 shown in FIG. 1. Computer 130 can include graphical user interface components, such as a mouse 132, keyboard 134 and display 136. Other types of interfaces can also be employed, such as a Personal Digital Assistant (PDA) in alternate embodiments. In some embodiments, the imaging device 110 can be connected full-time to the computer 130, particularly where the computer performs the image processing functions. Additionally and/or alternatively, the processor in imaging devices, such as those of the Insight® product line, can allow for independent operation of the device free interconnection with a remote computer. In this embodiment, computer 130 can be connected to, and/or communicates with, the imaging device 110 for device-setup, testing, and analysis of runtime operation.

In some embodiments, data related to a model or training image 140 can be stored in connection with the computer 130 in disc storage 142, and can be stored in the onboard memory of the imaging device 110. This data can include data associated with imaging process 10, which can be employed according to one or more embodiments of the present disclosure.

Figure 3:
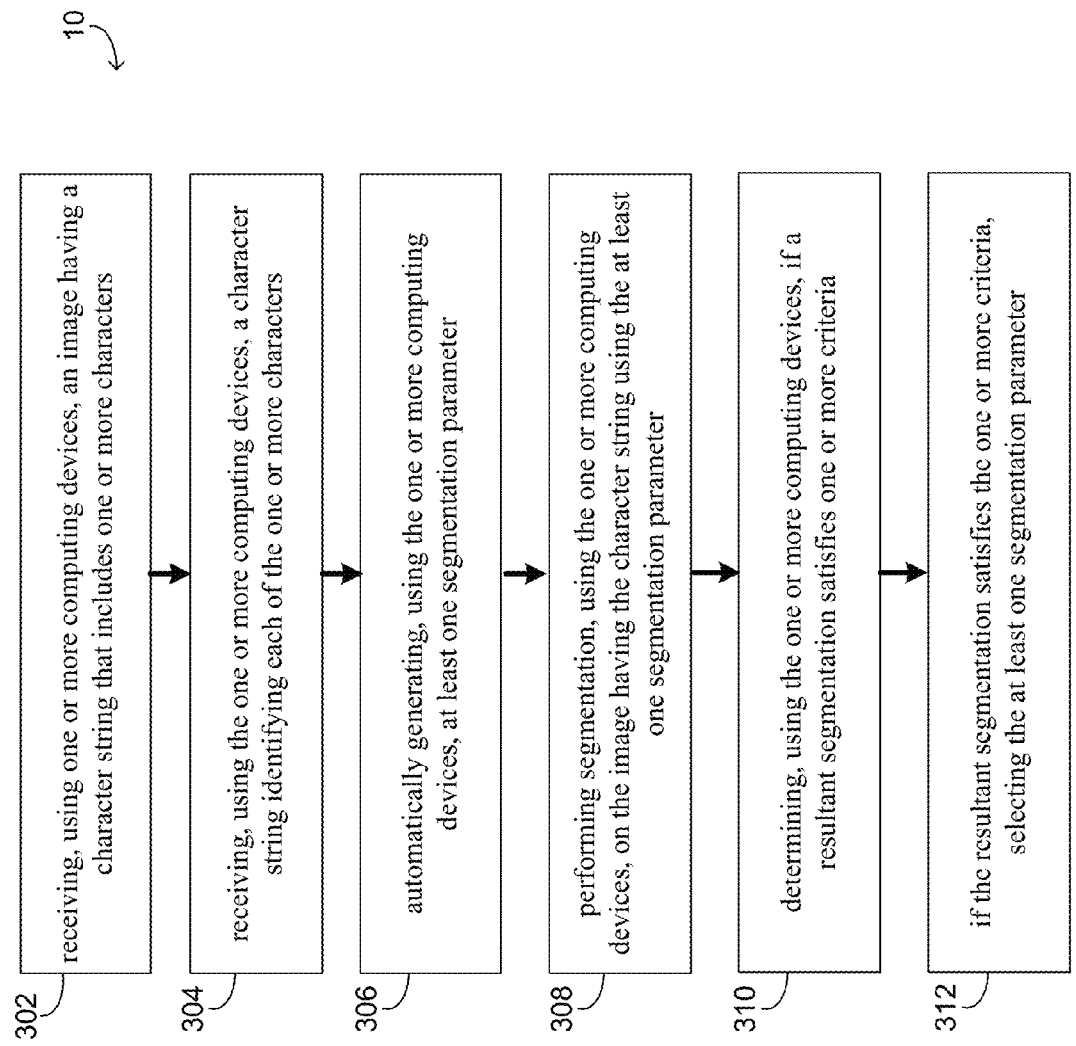
FIG. 3 is a flowchart depicting an embodiment of the imaging process of FIG. 1.

Referring also to FIG. 3, and as will be discussed below in greater detail, imaging process 10 can include receiving (302) an image having a character string that includes one or more characters. Imaging process 10 can also include receiving (304) a character string identifying each of the one or more characters. Imaging process 10 can also include automatically generating (306) at least one segmentation parameter. Imaging process 10 can include performing segmentation (308) on the image having the character string using the at least one segmentation parameter. Imaging process 10 can also include determining (310) if a resultant segmentation satisfies one or more criteria and if the resultant segmentation satisfies the one or more criteria, selecting (312) the at least one segmentation parameter.

Embodiments disclosed herein are directed towards a computer-implemented method for optical character recognition associated with machine vision inspection. In some embodiments, imaging process 10 can be configured to address many of the limitations of existing approaches. For example, some existing approaches address the setup problem by pre-training multiple fonts, and having the OCR tool test many fonts to determine which one is correct. It can then estimate other parameters, such as values for segmentation parameters. This approach is limited, because the font chosen can not match perfectly, which can result in sub-optimal parameter choices.

Figure 4:
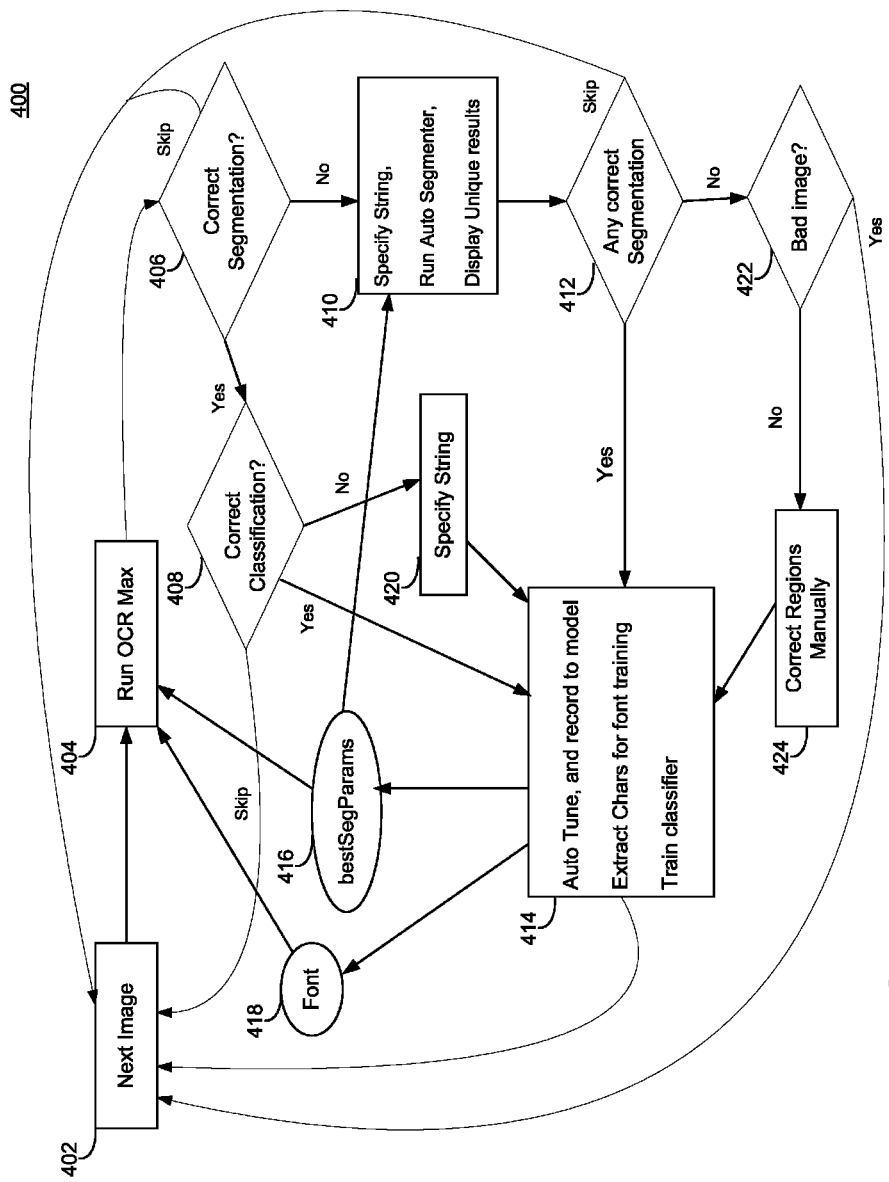
FIG. 4 is a flowchart depicting an embodiment of the imaging process of FIG. 1.

Referring now to FIG. 4, a flowchart 400 depicting an embodiment of imaging process 10 is provided. As shown in FIG. 4, imaging process 10 can utilize an incremental process having automatic segmentation as well as automatic tuning capabilities. In some embodiments, imaging process 10 can allow a user to iteratively set up an OCR tool with minimal information from the user. The end result being a fully configured and trained OCR tool. Accordingly, and as shown in FIG. 4, imaging process 10 can receive an image 402 having a character string that includes one or more characters. Imaging process 10 can provide the user with an option to continue imaging process 10 with the Run OCR Max option 404. Imaging process 10 can also provide a user-selectable option 406 associated with the segmentation. In some embodiments, the user-selectable option can be configured to allow a user to indicate either a correct segmentation or an incorrect segmentation. If the segmentation is correct, the user can be provided with an option 408 indicating either a correct classification or an incorrect classification. If the classification is correct, imaging process 10 can proceed to automatic tuning 414 as will be discussed in further detail below. If the classification is incorrect, the user can be provided with an option 420 to specify the character string.

In some embodiments, if the segmentation is incorrect imaging process 10 can provide automatic segmentation capabilities 410 as is discussed in further detail below. Following automatic segmentation, the user can be provided with an option of indicating if the segmentations results were correct via option 412. If a correct segmentation is found, imaging process 10 can proceed to automatic tuning 414. If no correct segmentation is found, the user can be provided with an option of identifying whether the image is bad. If so, imaging process 10 can receive one or more additional images, each having an additional character string. If not, imaging process 10 can provide the user with a user-selectable option 424 configured to allow the user to manually generate a segmentation.

In some embodiments, imaging process 10 can be used to generate a database of characters using, at least in part, one or more of the first character string and the additional character string. Once imaging process 10 has received an indication of a correct segmentation for the character string the associated correct set of segmentation parameters can be stored for future use. Accordingly, imaging process 10 can apply the correct set of segmentation parameters to future character strings. The correct set of segmentation parameters can then be tuned and one optimum segmentation parameter values found to be used. New font characters can then be extracted and a classifier trained and used. In this way, imaging process 10 can continue until the user gains confidence that the font is fully trained and the current segmentation parameters are working properly. The font and the segmentation parameters can be copied and the auto tuning process can proceed.

Figure 5:
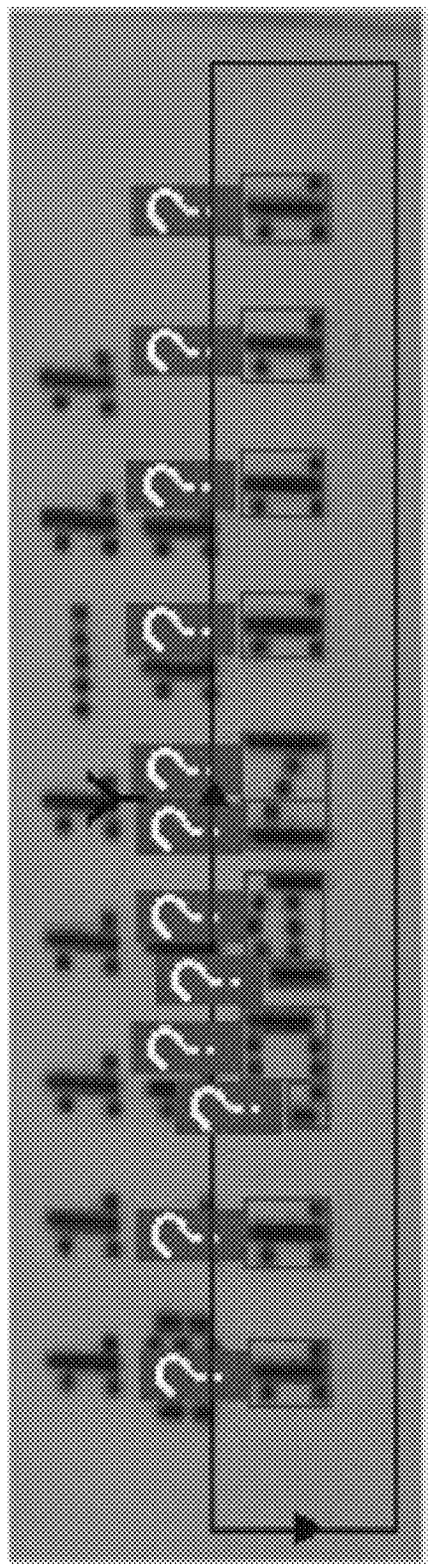
FIG. 5 is a diagrammatic view of an image associated with an embodiment of the imaging process of FIG. 1.

In some embodiments, imaging process 10 can address many of the issues a user can be faced with when setting up an OCR tool. In operation, when the user draws a region around a character string in an image and the default segmentation parameters do not work correctly, the average user can have a difficult time in figuring out what parameter to change for correct segmentation. For example, in existing systems, a segmentation tool can include various segmentation parameters, each of which can require manual alteration. The image depicted in FIG. 5 shows an example of a case where the default parameters failed to segment the characters correctly.

Figure 6:
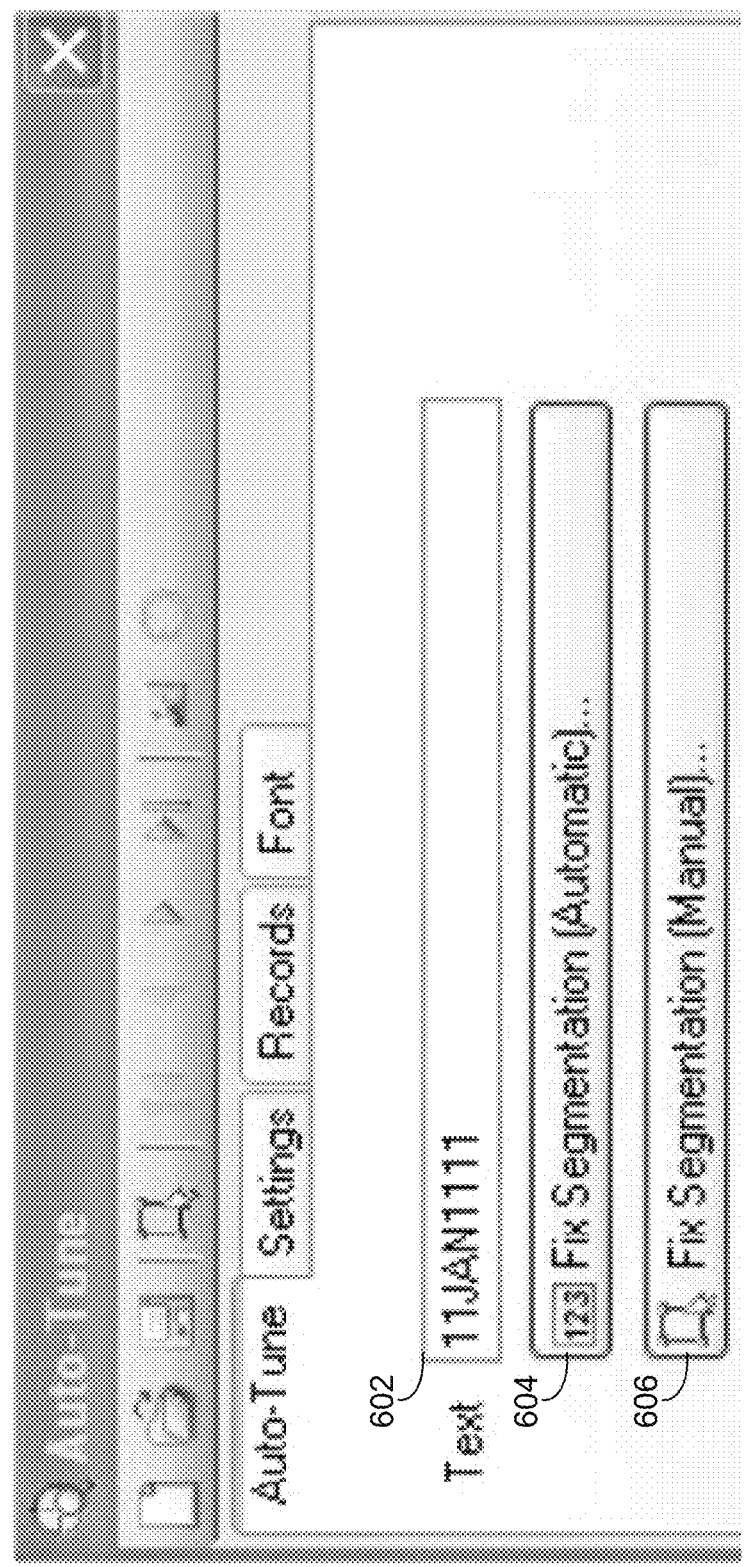
FIG. 6 is a graphical user interface associated with an embodiment of the imaging process of FIG. 1.

Referring now to FIG. 6, an embodiment of a graphical user interface 600 that can be used in accordance with imaging process 10 is provided. In operation, the user can specify the character string using text field 602. GUI 600 can allow the user to invoke the automatic segmentation algorithm by selecting automatic segmentation feature 604. GUI 600 can also allow the user to perform manual segmentation via manual segmentation feature 606.

In some embodiments, the automatic segmentation algorithm associated with imaging process 10 can proceed through a variety of segmentation parameter combinations and can explore multiple segmentation parameters and parameter combinations that find the same number of segments as the length of the string. The segmentation parameters are discussed in further detail below. As discussed herein, the phrase applying at least one segmentation parameter to the character string can refer to performing segmentation on the image of the character string using at least one segmentation parameter.

Figure 7:
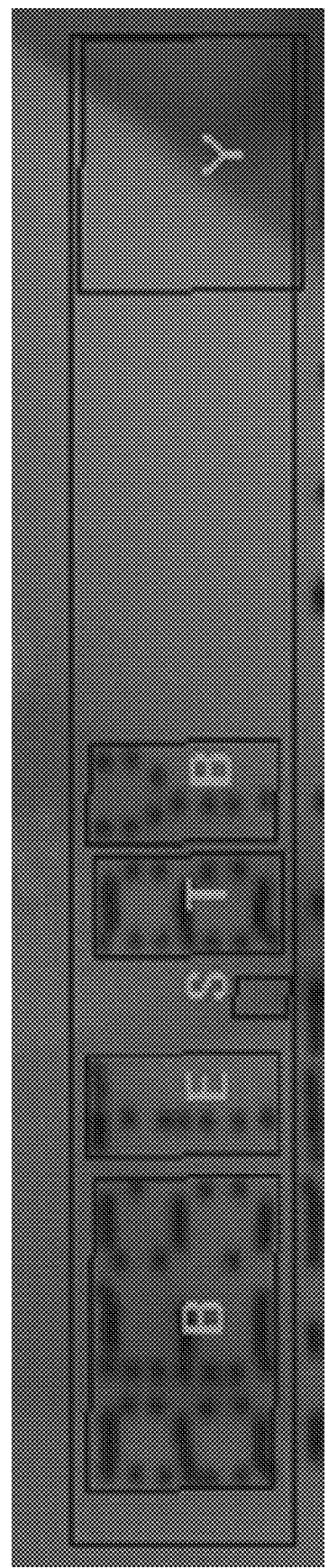
FIG. 7 is a diagrammatic view of an image associated with an embodiment of the imaging process of FIG. 1.
Figure 8:
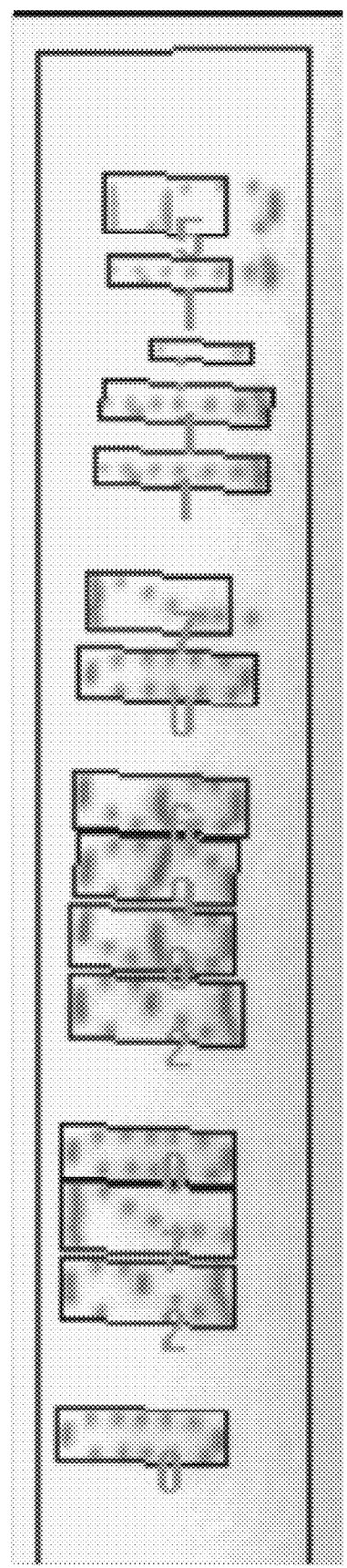
FIG. 8 is a diagrammatic view of an image associated with an embodiment of the imaging process of FIG. 1.
Figure 9:
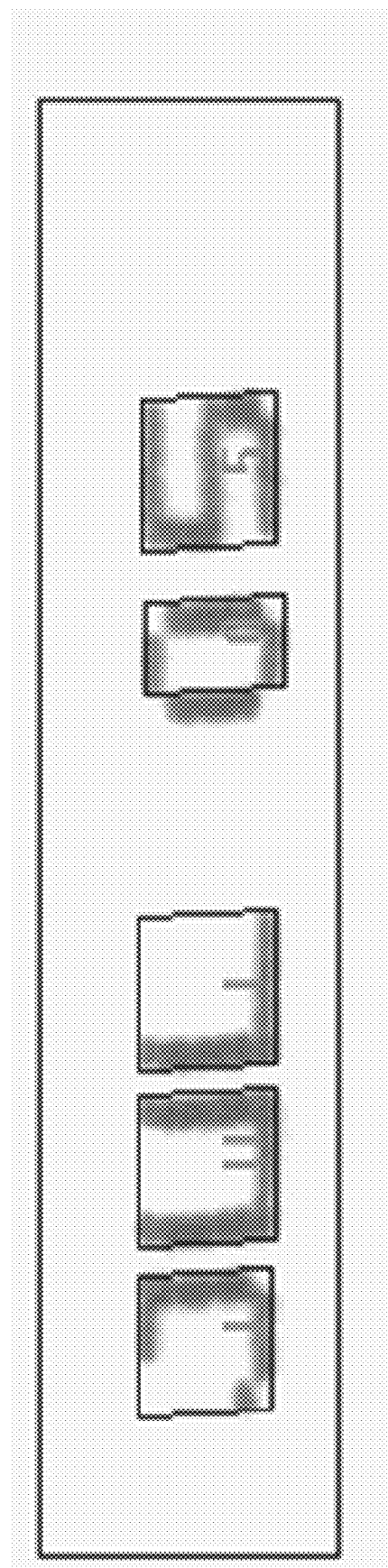
FIG. 9 is a diagrammatic view of an image associated with an embodiment of the imaging process of FIG. 1.

In some embodiments, in addition to identifying the correct number of segments, imaging process 10 can be configured to reject certain results based upon non-uniformity of characters. For example, given the ASCII representation of characters it can be determined if the character string contains a special character like narrow, short, or wide. In some embodiments, if the string does not contain any special characters all of the region widths and heights need to be the same size (or within a predefined tolerance) or the result can be rejected. If the character string contains a special character, individual character sizes can be checked for uniformity. Several examples of the non-uniform and rejected results are shown in FIGS. 7-9.

Figure 10:
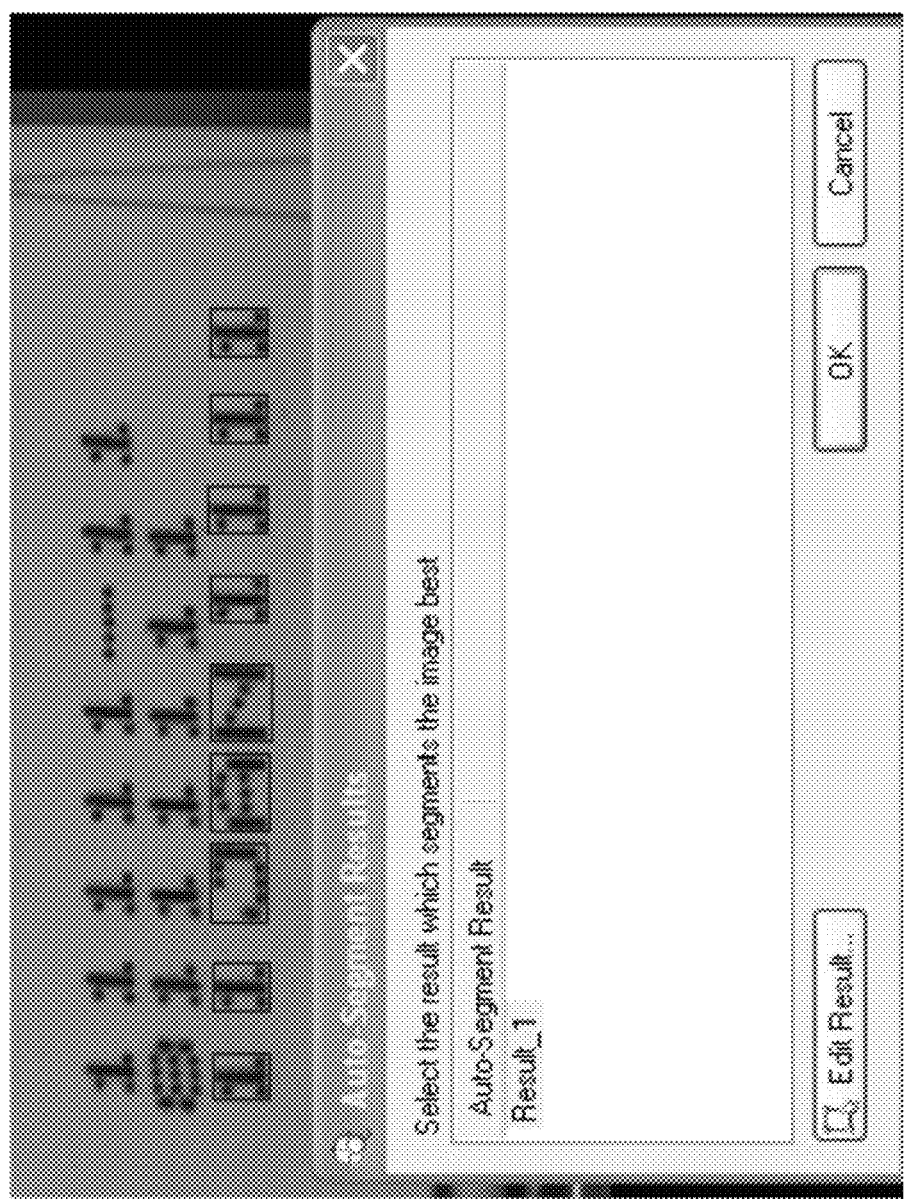
FIG. 10 is a graphical user interface associated with an embodiment of the imaging process of FIG. 1.
Figure 11:
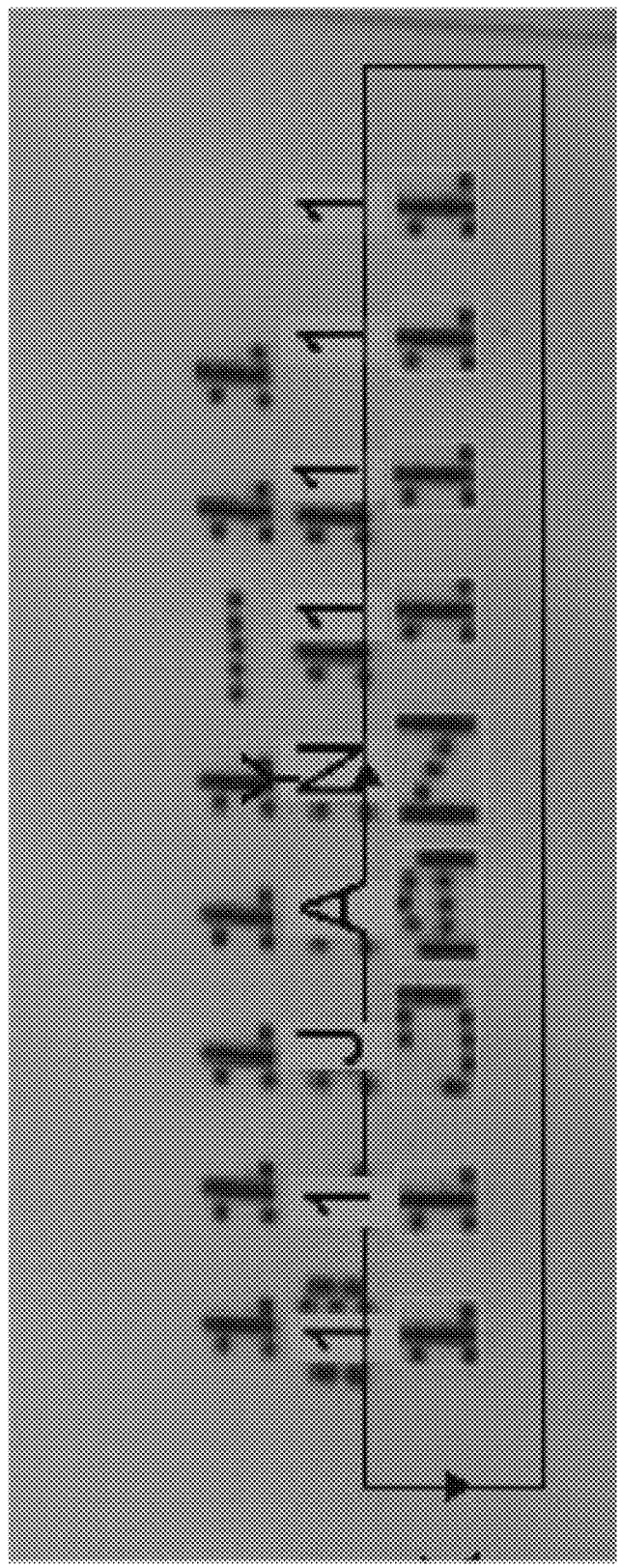
FIG. 11 is a diagrammatic view of an image associated with an embodiment of the imaging process of FIG. 1.

Referring now to FIG. 10, an embodiment depicting graphical user interface 1000 and an associated image are provided. Accordingly, the automatic segmentation algorithm associated with imaging process 10 can execute and generate one or more possibly correct results for display to the user as shown in FIG. 10. In operation, the user can select the one result that looks correct and select the OK icon associated with GUI 1000. The second part of the algorithm can now proceed. In this way, the auto tuning algorithm can identify the best and or optimum segmentation parameters to run for this particular image. The current record can be added to the model and each unique character can be extracted and a font can be trained for classification. The image depicted in FIG. 11 shows the result of running imaging process 10 after this operation with the characters segmented and classified correctly.

Figure 12:
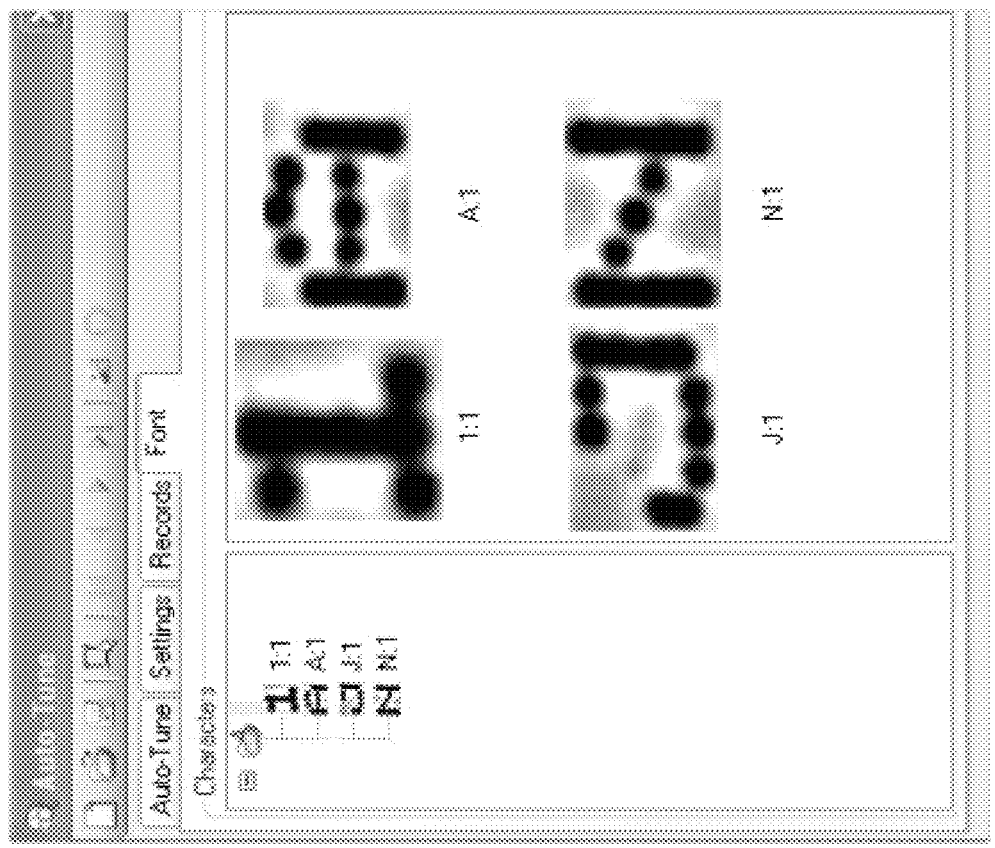
FIG. 12 is a graphical user interface associated with an embodiment of the imaging process of FIG. 1.
Figure 13:
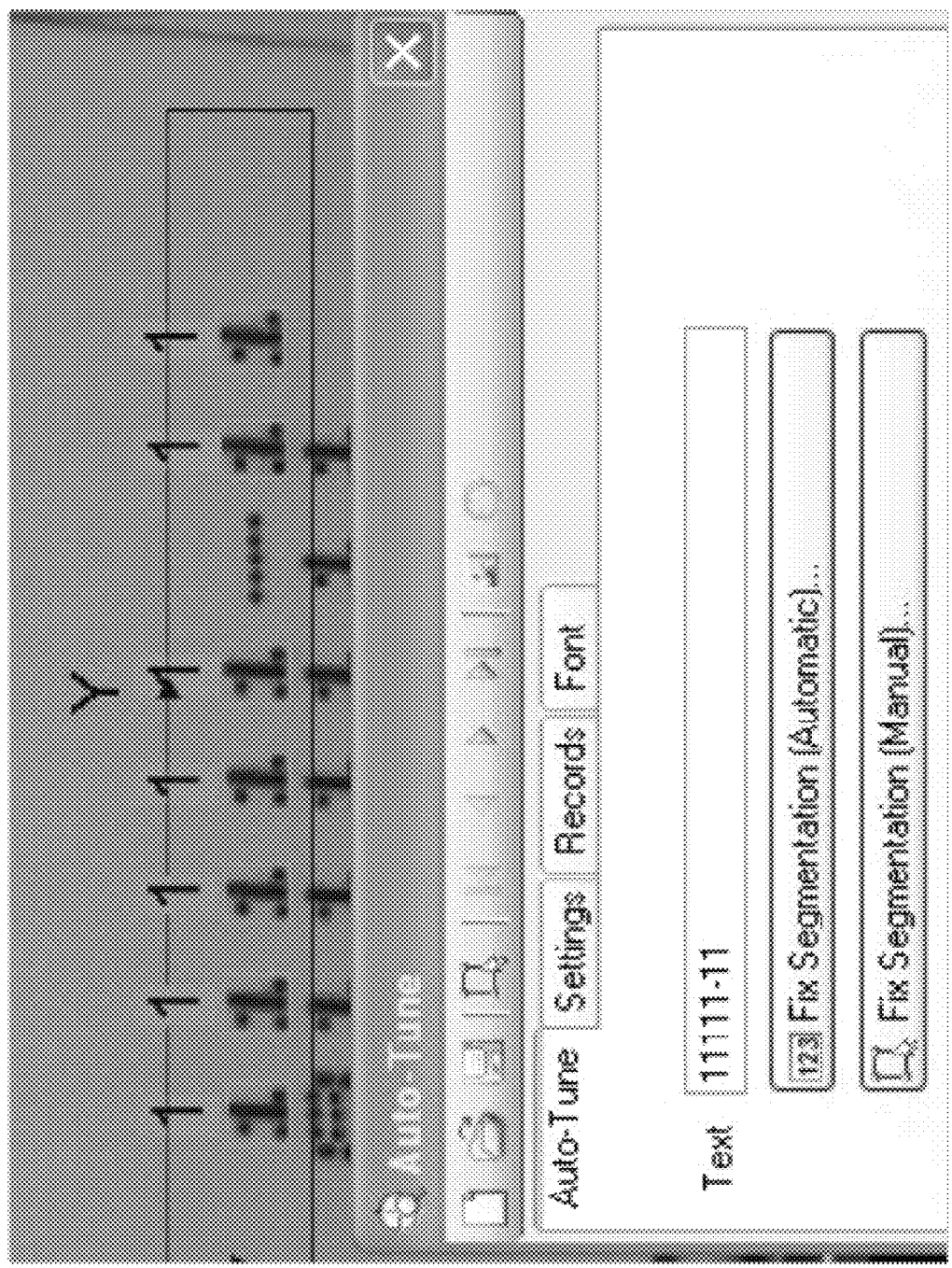
FIG. 13 is a graphical user interface associated with an embodiment of the imaging process of FIG. 1.
Figure 14:
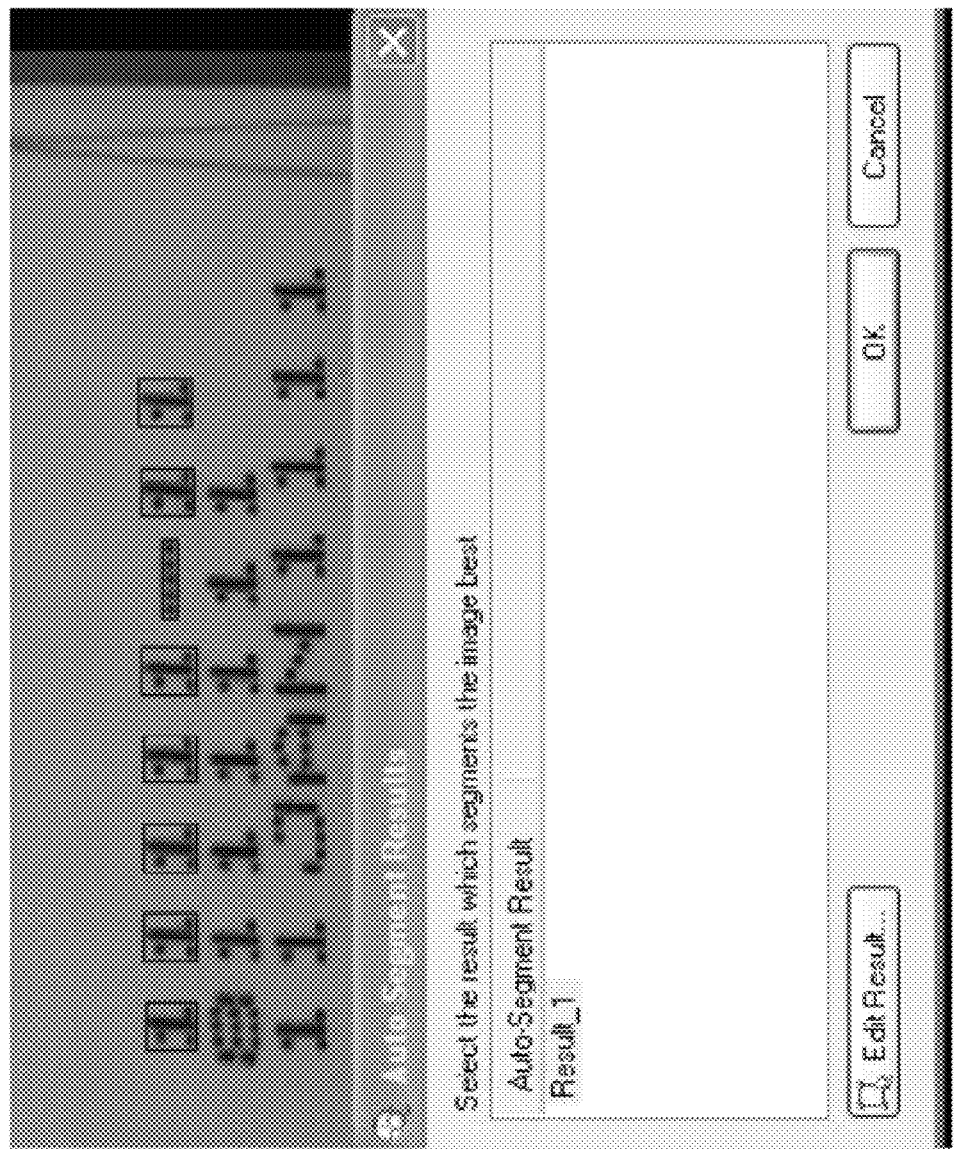
FIG. 14 is a graphical user interface associated with an embodiment of the imaging process of FIG. 1.

Referring now to FIGS. 12-14, embodiments depicting graphical user interfaces 1200-1400 are provided. GUI 1200 shows the characters that have been extracted during imaging process 10 for this particular font. If segmentation fails on the next image, the user can repeat one or more of the operations identified above as is shown in FIGS. 13-14.

Figure 15:
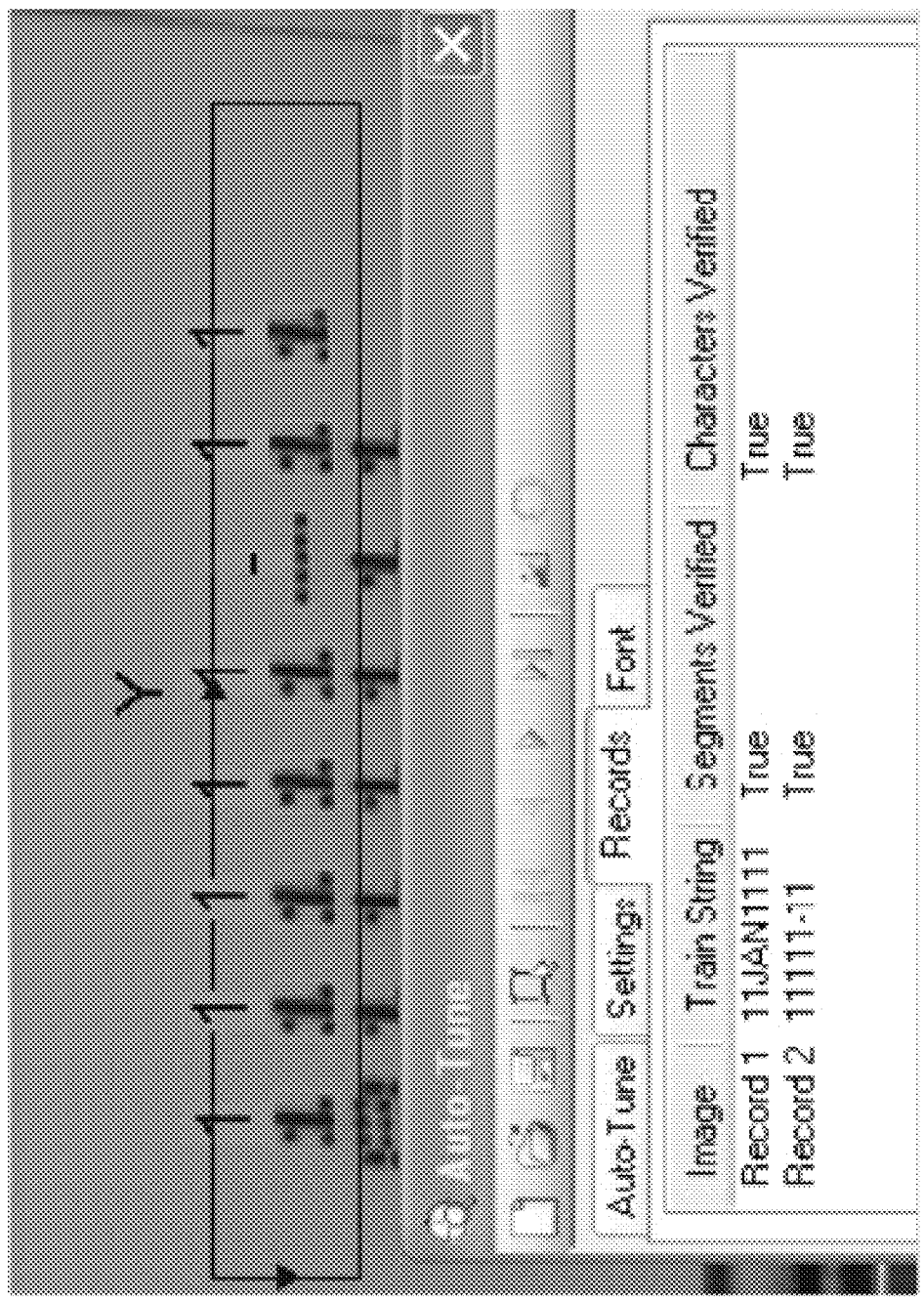
FIG. 15 is a graphical user interface associated with an embodiment of the imaging process of FIG. 1.
Figure 16:
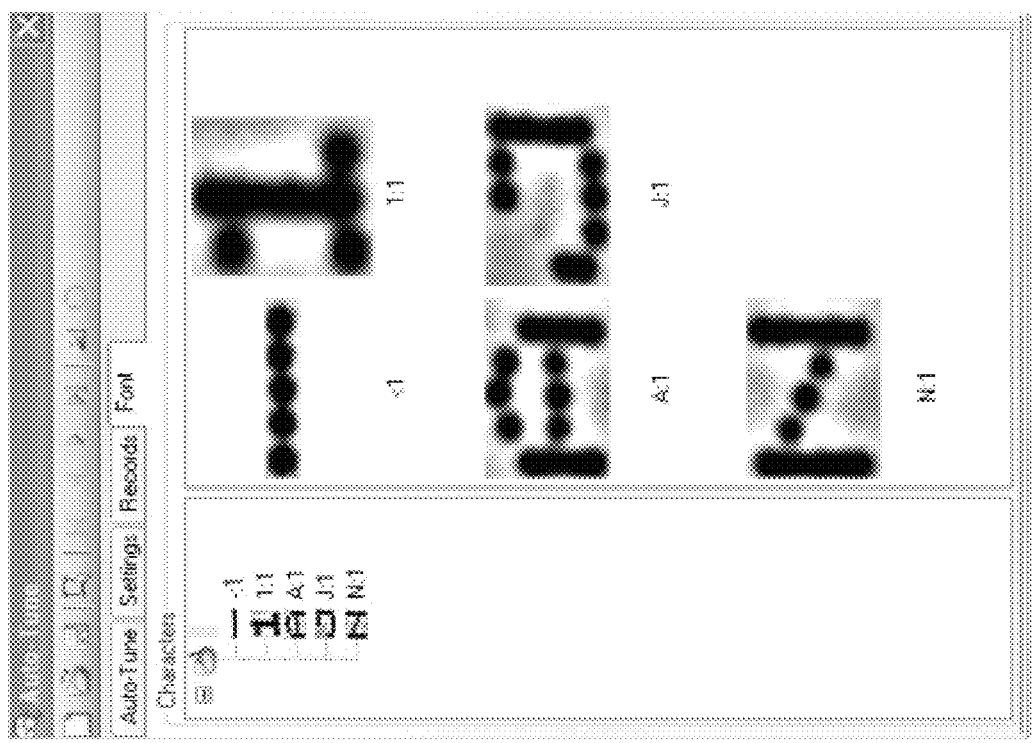
FIG. 16 is a graphical user interface associated with an embodiment of the imaging process of FIG. 1.

Referring now to FIGS. 15-16, an embodiment depicting graphical user interface 1500 is provided. As shown in FIG. 15, once a new record is added to the model, the extracted best segmentation parameters can operate on the previous records in addition to the new one. As depicted in this example, the font now includes the character "-" as shown in FIG. 16.

Figure 17:
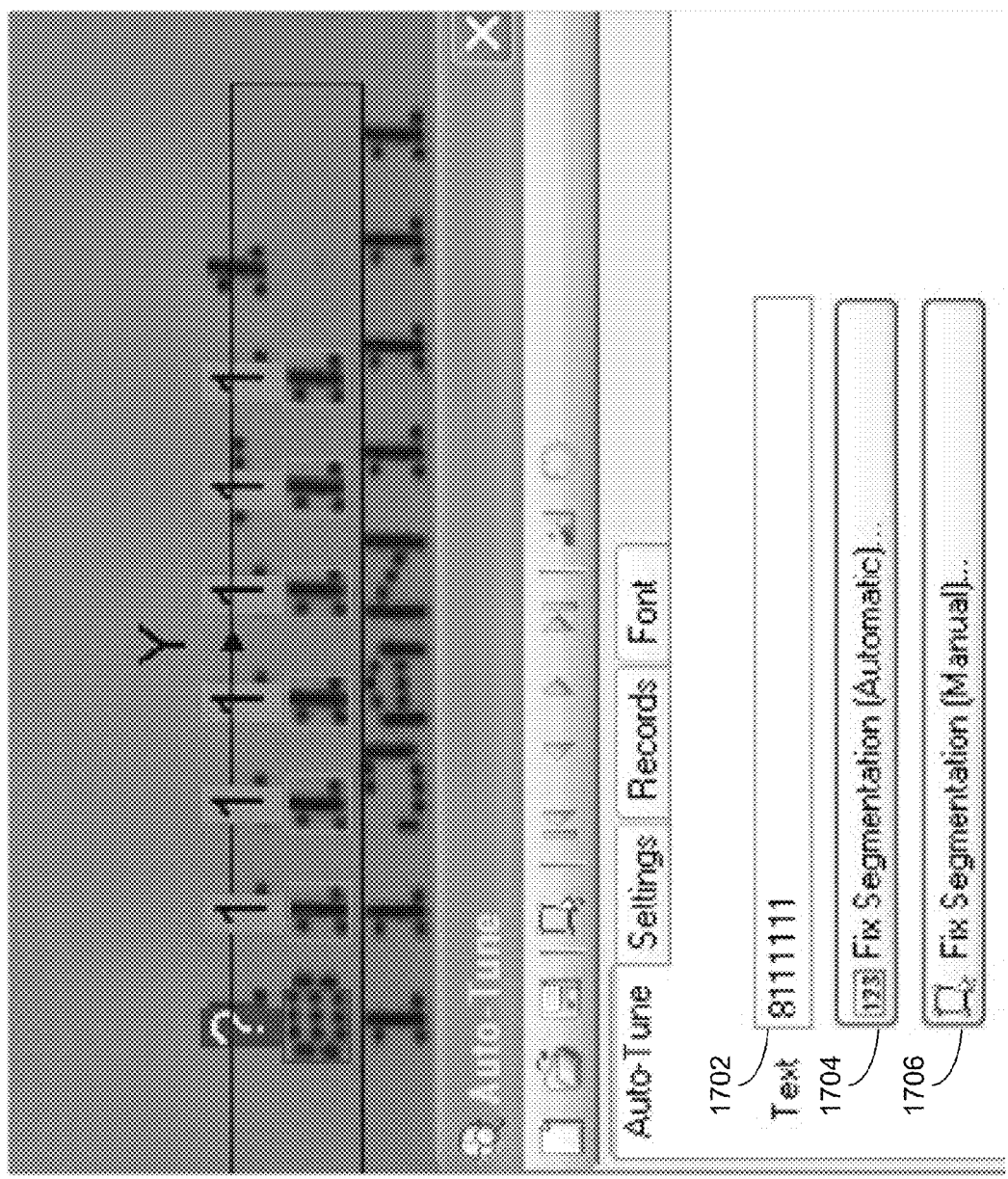
FIG. 17 is a graphical user interface associated with an embodiment of the imaging process of FIG. 1.
Figure 18:
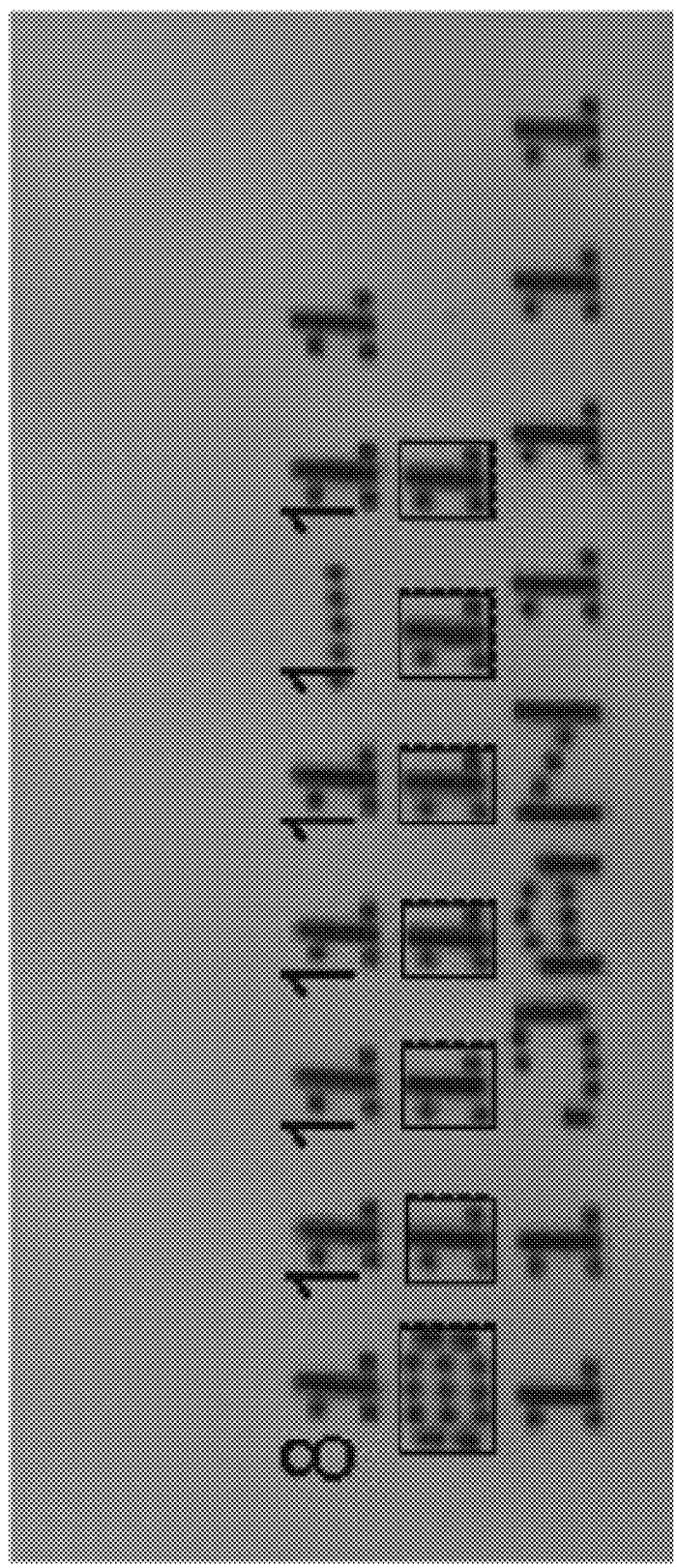
FIG. 18 is a diagrammatic view of an image associated with an embodiment of the imaging process of FIG. 1.
Figure 19:
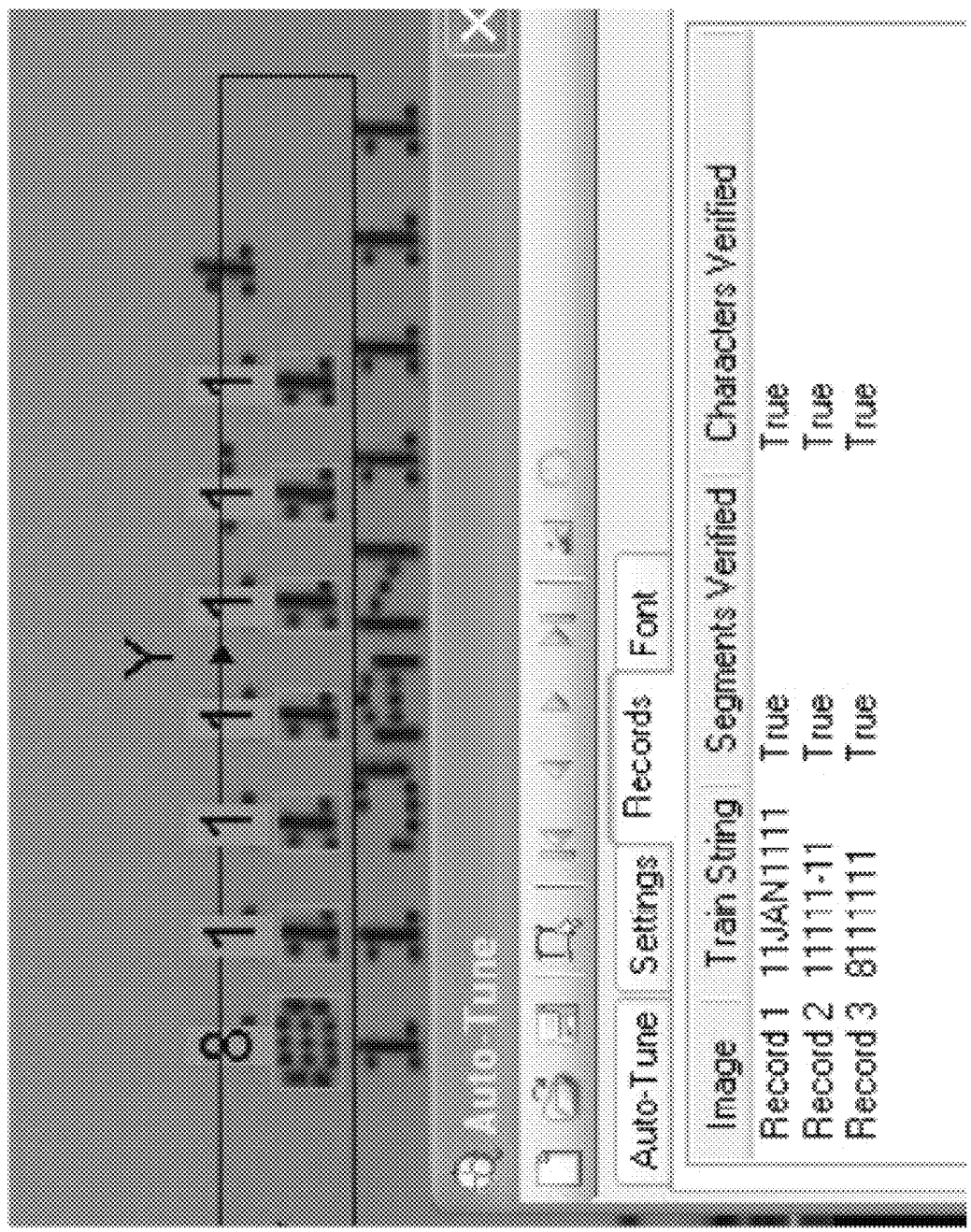
FIG. 19 is a graphical user interface associated with an embodiment of the imaging process of FIG. 1.
Figure 20:
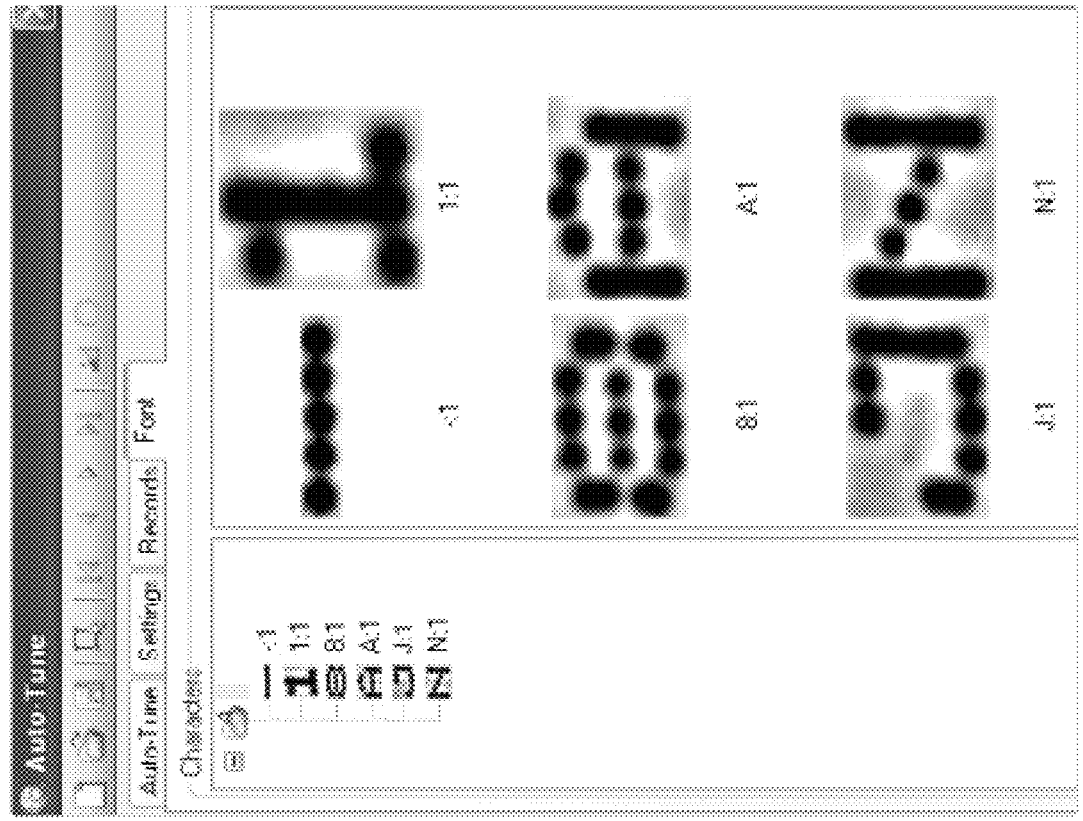
FIG. 20 is a graphical user interface associated with an embodiment of the imaging process of FIG. 1.

In some embodiments, imaging process 10 can allow the user to manually edit a particular character string. In this particular example, when the regions are edited and corrected manually, the automatic segmentation algorithm can operate based upon the established correct regions of the characters. FIG. 17 shows an example where the established segmentation parameters do not segment the character '8' correctly. Accordingly, the user can select manual segmentation feature 1706 and adjust the region around the character "8" to enclose the whole character as is shown in FIG. 18. After selecting OK, the automatic segmentation algorithm can be run given the correct location and size of each segment. Accordingly, the automatic segmentation algorithm associated with imaging process 10 can explore different combination of segmentation parameters and apply them on the current record as is shown in FIGS. 19-20. For each result that is computed (correctly or incorrectly) it can compare the result regions against the established correct regions.

Some possible scenarios can include, but are not limited to, identifying a good match between an established correct region and a result region within a tolerance (e.g., 80% area overlap by default). In this particular example, various different types of information can be extracted for good elements like min-max, pixel-count, width, height, etc. In some instances, there can be a region in the result that does not exist in the established correct regions. In this particular example, various data can be extracted for extra elements. Additionally and/or alternatively, there can be a region in the established correct regions that does not exist in the result. In this particular example, various data can be extracted for missing elements using the golden region and added to good elements. Additionally and/or alternatively, there can be a bad match between the two (e.g. area overlap can be less that the tolerance.). In this particular example, various data can be extracted using the established correct regions for good elements. This statistical data can be combined with all statistical data from the records in the model, if any. In some embodiments, segmentation parameters can be modified to exclude extra elements and include good elements. For some segmentation parameter combinations, this can produce a result where all regions match that of the established correct regions. The best matched result can be selected and added to the model. The most correct segmentation parameters can then be extracted in addition to the font characters.

In some embodiments, as the number of records in the model grows, the optimum number of font characters can be extracted to successfully classify all characters of the records in the model. If a second instance of a character is not classified correctly because it varies too much to the trained one, it can be added to the font. In this way, the user can confirm that his/her font works on all of the records.

As discussed herein, imaging process 10 can include one or more segmentation parameters. Some segmentation parameters can include, but are not limited to, those discussed below, which are provided merely by way of example and are not intended to be an exhaustive list.

In some embodiments, segmentation parameters can include the polarity. For example, the polarity of all of the characters in the input image.

In some embodiments, segmentation parameters can include, for example, the line refinement mode, which can specify the line refinement technique to be used. The line refinement mode can be either classic mode or standard.

In some embodiments, segmentation parameters can include, for example, the angle search range, which can correspond to half of the angle search range, in degrees. This is the angle used for the line is searched over the range relative to the angle of the search region.

In some embodiments, segmentation parameters can include, for example, skew range, which can correspond to half of the skew search range, in degrees. This is the skew used for the line can be searched over the range relative to the skew of the search region.

In some embodiments, segmentation parameters can include, for example, the normalization mode, which can specify the method used to normalize the input image. It can be set to global thresholding, local thresholding, or local advanced.

In some embodiments, segmentation parameters can include, for example, the stroke width, which can specify whether to remove from the normalized image everything that does not appear to have the same stroke width as the rest of the image. This can be useful if, for example, characters appear to be connected to each other by thin noise streaks.

In some embodiments, segmentation parameters can include, for example, a binarization threshold, which can specify a modifier used to compute the binarization threshold, in the normalized image, that binarizes between foreground and background.

In some embodiments, segmentation parameters can include, for example, border fragments, which can specify whether to completely ignore any fragments that touch any border of the search region.

In some embodiments, segmentation parameters can include fragment pixel count, for example, the minimum number of foreground (e.g. text) pixels that a character fragment can have in order to be considered for possible inclusion in a character. A character fragment can be a blob in the binarized image.

In some embodiments, segmentation parameters can include, for example, the minimum number of foreground (e.g. text) pixels that a character must have in order to be reported.

In some embodiments, segmentation parameters can include a fragment contrast threshold, for example, the minimum amount of contrast (e.g. in normalized image grey levels) that a fragment must have, relative to the binarization threshold, in order to be considered for possible inclusion in a character.

In some embodiments, segmentation parameters can include character height, for example, the minimum height of a character's mark rectangle, in pixels, that a character must have in order to be reported. Segmentation parameters can also include whether to use a maximum character height function to limit the maximum height of a character and/or the line of characters. Segmentation parameters can also include the maximum allowable height of a character's mark rectangle, in pixels.

In some embodiments, segmentation parameters can include the character width, for example, the minimum width of a character's mark rectangle, in pixels, that a character must have in order to be reported. Segmentation parameters can also include the maximum allowable width of a character's mark rectangle, in pixels. A character wider than this value can be split into pieces that are not too wide. Segmentation parameters can also include whether to use a maximum character width function to limit the maximum width of a character.

In some embodiments, segmentation parameters can include intercharacter gap, for example, the minimum gap size, in pixels, that can occur between two characters. If the gap between two fragments is smaller than this, then they must be considered to be part of the same character.

In some embodiments, segmentation parameters can include intracharacter gap, for example, the maximum gap size, in pixels, that can occur within a single character, even for damaged characters. An intracharacter gap might occur, for example, between successive columns of dots in dot matrix print, or between two pieces of a solid character that was damaged by a scratch. Any gap larger than this value can be interpreted as a break between two separate characters, whereas gaps less than or equal to this value can be interpreted either as a break between two separate characters or as a gap within a single character.

In some embodiments, segmentation parameters can include fragment distance to main line, for example, the maximum distance a fragment can have outside the main line of characters as percentage of estimated line height.

In some embodiments, segmentation parameters can include a character fragment merge mode, which can specify, for example, the mode used to determine whether to merge two fragments into one character during the Group stage. This mode can be set to: requireOverlap (e.g. Character fragments must overlap horizontally by at least one pixel to be merged). It can also be specified to specifyMinIntercharacterGap (e.g. Character fragments with a horizontal gap between them can be merged to form characters, where any two fragments with a gap less than minIntercharacterGap can be merged). It can also be specified to specifyGaps (e.g. Character fragments with a horizontal gap between them can be merged to form characters, with the decision to merge two fragments based on both minIntercharacterGap and maxIntracharacterGap).

In some embodiments, segmentation parameters can include minimum character aspect, which can, for example, specify whether to split wide characters.

In some embodiments, segmentation parameters can include character width type, which can, for example specify how the widths of characters in the font are expected to vary. Note that the character width is the width of the mark rectangle (e.g. the bounding box of the ink), not the cell rectangle (which would typically include padding around the mark rectangle). The width type can be set to "unknown", "fixed" or "variable".

In some embodiments, segmentation parameters can include analysis mode, which can specify, for example, whether to perform "minimal analysis" or "standard analysis". Minimal analysis can perform straightforward segmentation according to the parameters above. Standard analysis performs an analysis of the line as a whole, including, for example, character spacing, to determine the optimal segmentation.

In some embodiments, segmentation parameters can include pitch metric, which can be used, for example, to specify the spacing of characters. Note that pitch is the distance between (approximately) corresponding points on adjacent characters and not the distance from the end of one character to the beginning of the next character (which is called the "intercharacter gap"). It can be set to "unknown", "leftToLeft", "centerToCenter", "rightToRight", etc.

In some embodiments, segmentation parameters can include pitch type, which can specify, for example, how individual pitch values are expected to vary; the pitch values are measured as specified by the pitch metric. It can be set to "unknown", "fixed", "proportional" or "variable".

In some embodiments, segmentation parameters can include minimum pitch, which can specify, for example, the minimum pitch, in pixels, that can occur between two characters, where the pitch is computed as specified by the pitch metric.

In some embodiments, segmentation parameters can include space insertion, which can specify, for example, how to handle insertion of space characters into gaps between other characters. It can be set to "no space", "single space", or "multiple spaces".

In some embodiments, segmentation parameters can include width of space character, which can specify, for example, the minimum width of a space character, in pixels. Additionally and/or alternatively, segmentation parameters can include the maximum width of space character, which can specify, for example, the maximum width of space character in pixels.

In some embodiments, segmentation parameters can include the minimum fraction by which two character fragments must overlap each other in the x direction in order for the two fragments to be considered part of the same character.

In some embodiments, segmentation parameters can include the minimum allowable aspect of a character, where the aspect is defined as the height of the entire line of characters divided by the width of the character's mark rectangle. A character whose aspect is smaller than this value (e.g. whose width is too large) will be split into pieces that are not too wide.

In some embodiments, imaging process 10 can include automatically segmenting given only the correct string and rejecting non-uniform results. Imaging process 10 can also automatically segment given the string and an established correct regions of characters. As discussed herein, imaging process 10 can be configured to train a given font from model records.

In some embodiments, imaging process 10 can include receiving a new image containing an example character string and receiving a string identifying the correct characters in that string, but not the correct segmentation regions of the string. Imaging process 10 can be configured to automatically generate possible segmentations of the image of the string with various sets of segmentation parameters. Imaging process 10 can choose among possible correct segmentations of the string, each of which has associated with it candidate segmentation parameters and can use the segmentation parameters of the chosen correct segmentation of the string for optical character recognition.

In some embodiments, imaging process 10 can include receiving a new image containing an example character string and identifying the correct characters in that string, but not the correct segmentation of the string. Imaging process 10 can automatically generate candidate sets of segmentation parameters and segmentation results of the image of the string. Imaging process 10 can choose among possible correct segmentations of the string, each of which has associated with it candidate segmentation parameters and can search all candidate results and compare the segmentation regions to that of the one chosen by the user and identify segmentation parameters that produce similar regions within a certain percentage. Imaging process 10 can store the chosen image with correct segmentation of the string in the model in addition to all segmentation parameters found. Imaging process 10 can repeat the operations identified above until the segmentation parameters have been selected uniquely or found optimally.

In some embodiments, imaging process 10 can include receiving a new image containing an example character string and identifying the correct characters in that string, but not the correct segmentation of the string. Imaging process 10 can be configured to automatically generate candidate sets of segmentation parameters and segmentation results of the image of the string. Imaging process 10 can choose among possible correct segmentations of the string, each of which has associated with it candidate segmentation parameters. If none of the choices above are correct, then imaging process 10 can supply the correct segmentation of the string and automatically determine segmentation parameters given the correct segmentation of the string. Imaging process 10 can store the chosen image with correct segmentation of the string in the model in addition to all segmentation parameters found. Imaging process 10 can repeat the operations above until the segmentation parameters have been selected uniquely or found optimally.

In some embodiments, imaging process 10 can include attempt different segmentation parameters and generate results having the same number of segments as the length of the string. Imaging process 10 can reject possible results that do not meet a uniformity criterion given the ASCII representation of characters in the string. Imaging process 10 can generate a vector of possible segmentations of the image of the string and associated candidate segmentation parameters.

In some embodiments, imaging process 10 can receive a vector of images with correct segmentation of the string in addition to all segmentation parameters found previously. Imaging process 10 can attempt all previously found segmentation parameters and generate results having the same number of segments as the length of the string. Imaging process 10 can reject possible results that do not meet a uniformity criterion given the ASCII representation of characters in the string. Imaging process 10 can generate a vector of possible segmentations of the image of the string and associated candidate segmentation parameters.

In some embodiments, imaging process 10 can receive a vector of images with correct segmentation of the string in addition to all segmentation parameters found previously. Imaging process 10 can attempt all previously found segmentation parameters and generate results having the same number of segments as the length of the string. If unsuccessful for any segmentation parameter, imaging process 10 can adjust the parameters using statistical data from the previous run and retry in an iterative matter. Imaging process 10 can reject possible results that do not meet a uniformity criterion given the ASCII representation of characters in the string. Imaging process 10 can apply the stored segmentation parameters on the vector of images with correct segmentation and reject the ones that fail. Imaging process can generate a vector of possible segmentations of the image of the string and associated candidate segmentation parameters.

In some embodiments, imaging process 10 can receive a vector of images with correct segmentation of the string. Imaging process 10 can extract ranges for segmentation parameters from the vector of images with correct segmentation of the string. Some examples can include, but are not limited to, ranges for character width, height, number of pixels for fragments and characters, inter and intra character gaps, etc. Imaging process 10 can attempt different segmentation parameters within the extracted ranges and generate results having the same number of segments as the length of the string. Imaging process 10 can reject possible results that do not meet a uniformity criterion given the ASCII representation of characters in the string. Imaging process 10 can apply the stored segmentation parameters on the vector of images with correct segmentation and reject the ones that fail. Imaging process 10 can generate a vector of possible segmentations of the image of the string and associated candidate segmentation parameters.

In some embodiments, imaging process 10 can be configured to automatically generate possible segmentation parameters given an image containing an example character string, correct characters in that string, and the correct segmentation of the string. In this way, imaging process 10 can extract ranges for segmentation parameters from the correct segmentation of the string. Some examples can include, but are not limited to, ranges for character width, height, number of pixels, pitch, and inter character gap. Imaging process 10 can attempt different segmentation parameters within the extracted ranges and only keep results with regions that almost (e.g. within a certain percentage) match that of the correct segmentation of the string. Imaging process 10 can generate a vector of correct segmentations of the image of the string and associated correct segmentation parameters.

In some embodiments, imaging process 10 can be configured to receive a vector of images with a correct segmentation of the string in addition to all segmentation parameters found previously. Imaging process 10 can attempt all previously found segmentation parameters and only keep results with regions that almost (e.g. within a certain percentage) match that of the correct segmentation of the string. Imaging process 10 can generate a vector of possible segmentations of the image of the string and associated candidate segmentation parameters.

In some embodiments, imaging process 10 can be configured to receive a vector of images with a correct segmentation of the string in addition to all segmentation parameters found previously. Imaging process 10 can be configured to extract ranges for segmentation parameters from the correct segmentation of the string. Some examples can include, but are not limited to, ranges for character width, height, number of pixels, pitch, and inter character gap. Imaging process 10 can expand all previously found segmentation parameters by adding different analysis and normalization modes, foreground thresholds, width types, and the like. Imaging process 10 can expand segmentation parameters and only keep results with regions that almost (e.g. within a certain percentage) match that of the correct segmentation of the string. Imaging process 10 can generate a vector of possible segmentations of the image of the string and associated candidate segmentation parameters.

In some embodiments, imaging process 10 can receive a vector of images with a correct segmentation of the string in addition to all segmentation parameters found previously. Imaging process 10 can be configured to extract ranges for segmentation parameters from the correct segmentation of the string. Some examples can include, but are not limited to, ranges for character width, height, number of pixels, pitch, and inter character gap. Imaging process 10 can attempt all previously found and expanded segmentation parameters and only keep results with regions that almost (e.g. within a certain percentage) match that of the correct segmentation of the string. If unsuccessful for any segmentation parameter, imaging process 10 can adjust the parameters using statistical data from the previous run and retry in an iterative matter. Imaging process 10 can apply the stored segmentation parameters on the vector of images with correct segmentation and reject the ones that fail. Imaging process 10 can generate a vector of possible segmentations of the image of the string and associated candidate segmentation parameters.

In some embodiments, imaging process 10 can receive a vector of images with a correct segmentation of the string. Imaging process 10 can be configured to extract ranges for segmentation parameters from the correct segmentation of the string. Some examples can include, but are not limited to, ranges for character width, height, number of pixels, pitch, and inter character gap. Imaging process 10 can be configured to extract ranges for segmentation parameters from the vector of images with correct segmentation of the string. Some examples can include, but are not limited to, ranges for character width, height, number of pixels for fragments and characters, inter and intra character gaps, etc. Imaging process 10 can apply different segmentation parameters within the extracted ranges and only keep results with regions that almost (e.g. within a certain percentage) match that of the correct segmentation of the string. Imaging process 10 can apply the stored segmentation parameters on the vector of images with correct segmentation and reject the ones that fail. Imaging process 10 can generate a vector of possible segmentations of the image of the string and associated candidate segmentation parameters.

In some embodiments, imaging process 10 can include automatically adjusting segmentation parameters using statistical data from a previous run of the segmentation algorithm. Imaging process 10 can include receiving a new image containing an example character string and identifying the correct characters in that string, but not the correct segmentation of the string. Imaging process 10 can supply a segmentation parameter set, apply the segmentation algorithm and compare the number of segmented regions to the length of the string. If number of segmented regions is less than the length of the string, imaging process 10 can adjust the segmentation parameters to include more of the rejected elements. If number of segmented regions is more than the length of the string, segmentation parameters can be adjusted to exclude more of the kept elements. Imaging process 10 can repeat some or all of the operations described above for a maximum number of iterations or until the same number of segments is found.

In some embodiments, imaging process 10 can include receiving a new image containing an example character string and identifying the correct characters in that string, and the correct segmentation of the string. Imaging process 10 can supply a segmentation parameter set and apply the segmentation algorithm and compare segmented regions to that of the correct segmentation. Statistical data can be extracted for each segment including width, height, pixel count, fragment pixel count, contrast, and the like. Statistical data for missing segments (e.g. those that do not exist in the result at a particular location) can be collected in a group. Statistical data for correct segments (e.g. those that overlap well) can be added to the group. Statistical data for wrong results (e.g. those that do not overlap very well) can be extracted from the correct segmentation of the string and added to the group. Statistical data for extra segments (e.g. those that do not exist in the correct segmentation of the string at the particular location) can be collected separately. Segmentation parameters can be adjusted to exclude extra segments but include all the others. Imaging process 10 can iteratively repeat one or more of the operations described above for a maximum number of iterations or until correct segmentation is found.

As will be appreciated by one skilled in the art, the present disclosure can be embodied as a method, system, or computer program product. Accordingly, the present disclosure can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, the present disclosure can take the form of a computer program product on a computer-usable storage medium having computer-usable program code embodied in the medium.

Any suitable computer usable or computer readable medium can be utilized. The computer-usable or computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, propagate, or transport the program for use by or in connection with the instruction execution system, apparatus, or device. The computer-usable medium can include a propagated data signal with the computer-usable program code embodied therewith, either in baseband or as part of a carrier wave. The computer usable program code can be transmitted using any appropriate medium, including but not limited to the Internet, wireline, optical fiber cable, RF, etc.

Computer program code for carrying out operations of the present disclosure can be written in an object oriented programming language such as Java, Smalltalk, C++ or the like. However, the computer program code for carrying out operations of the present disclosure can also be written in conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a local area network (LAN) or a wide area network (WAN), or the connection can be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for selecting at least one segmentation parameter for optical character recognition comprising:
    receiving, using one or more computing devices, an image having a character string that includes one or more characters;
    receiving, using the one or more computing devices, a character string identifying each of the one or more characters;
    automatically generating, using the one or more computing devices, at least one segmentation parameter;
    performing segmentation, using the one or more computing devices, on the image having the character string using the at least one segmentation parameter, wherein segmentation is configured to separate each character of the character string;
    determining, using the one or more computing devices, if a resultant segmentation satisfies an ASCII uniformity criteria; and
    if the resultant segmentation satisfies the ASCII uniformity criteria, selecting the at least one segmentation parameter.

2. The computer-implemented method of claim 1, further comprising:
    providing, using the one or more computing devices, a user-selectable option associated with the segmentation, the user-selectable option configured to allow a user to indicate either a correct segmentation or an incorrect segmentation.

3. The computer-implemented method of claim 1, further comprising:
    providing, using the one or more computing devices, a user-selectable option configured to allow a user to manually generate a manually generated segmentation.

4. The computer-implemented method of claim 1, further comprising:
    determining, using one or more computing devices, if a resultant segmentation satisfies one or more criteria based on the criteria being set to a threshold value or an optimization value.

5. The computer-implemented method of claim 1, further comprising:
    generating, using the one or more computing devices, a database of images each having its own character string and correct segmentation regions for each character.

6. The computer-implemented method of claim 1, further comprising:
    receiving, using the one or more computing devices, an indication of a correct segmentation for the character string having a correct set of segmentation parameters.

7. The computer-implemented method of claim 6, further comprising:
    applying, using the one or more computing devices, the correct set of segmentation parameters to a second image in a database.

8. The computer-implemented method of claim 1, wherein the at least one segmentation parameter includes one or more of polarity, line refinement, angle search range, skew search range, normalization mode, stroke width, binarization threshold, border fragments, pixel count, fragment contrast threshold, character height, character width, intercharacter gap, intracharacter gap, fragment distance to main line, fragment merge mode, minimum character aspect, character width type, analysis mode, pitch metric, pitch type, minimum pitch, space insertion, width of space character.

9. A computer program product residing on a non-transitory computer readable storage medium having a plurality of instructions stored thereon, which when executed by a processor, cause the processor to perform operations comprising:
receiving, using one or more computing devices, an image having a character string that includes one or more characters;
receiving, using the one or more computing devices, a character string identifying each of the one or more characters;
automatically generating, using the one or more computing devices, at least one segmentation parameter;
performing segmentation, using the one or more computing devices, on the image having the character string using the at least one segmentation parameter, wherein segmentation is configured to separate each character of the character string;
determining, using the one or more computing devices, if a resultant segmentation satisfies an ASCII uniformity criteria; and
if the resultant segmentation satisfies the A criteria, selecting the at least one segmentation parameter.

10. The computer program product of claim 9, wherein operations further comprise:
providing, using the one or more computing devices, a user-selectable option associated with the segmentation, the user-selectable option configured to allow a user to indicate either a correct segmentation or an incorrect segmentation.

11. The computer program product of claim 9, wherein operations further comprise:
providing, using the one or more computing devices, a user-selectable option configured to allow a user to manually generate a manually generated segmentation.

12. The computer program product of claim 9, wherein operations further comprise:
determining, using one or more computing devices, if a resultant segmentation satisfies one or more criteria based on the criteria being set to a threshold value or an optimization value.

13. The computer program product of claim 12, wherein operations further comprise:
generating, using the one or more computing devices, a database of images each having its own character string and correct segmentation regions for each character.

14. The computer program product of claim 9, wherein operations further comprise:
receiving, using the one or more computing devices, an indication of a correct segmentation for the character string having a correct set of segmentation parameters.

15. The computer program product of claim 14, wherein operations further comprise:
applying, using the one or more computing devices, the correct set of segmentation parameters to a second image in a database.

16. The computer program product of claim 9, wherein the at least one segmentation parameter includes one or more polarity, line refinement, angle search range, skew search range, normalization mode, stroke width, binarization threshold, border fragments, pixel count, fragment contrast threshold, character height, character width, intercharacter gap, intracharacter gap, fragment distance to main line, fragment merge mode, minimum character aspect, character width type, analysis mode, pitch metric, pitch type, minimum pitch, space insertion, width of space character.

17. A computing system configured for selecting at least one segmentation parameter for optical character recognition comprising:
one or more processors configured to receive an image having a character string that includes one or more characters, the one or more processors further configured to receive a character string identifying each of the one or more characters, the one or more processors further configured to automatically generate at least one segmentation parameter, the one or more processors further configured to perform segmentation on the image having the character string using the at least one segmentation parameter, wherein segmentation is configured to separate each character of the character string, the one or more processors further configured to determine if a resultant segmentation satisfies an ASCII uniformity criteria and if the resultant segmentation satisfies the ASCII uniformity criteria, the one or more processors further configured to select the at least one segmentation parameter.

18. The computing system of claim 17, wherein the one or more processors are further configured to receive an indication of a correct segmentation for the character string having a correct set of segmentation parameters and to apply the correct set of segmentation parameters to a second character string.

* * * * *